US011550649B2

(12) United States Patent
Purohit

(10) Patent No.: US 11,550,649 B2
(45) Date of Patent: Jan. 10, 2023

(54) SYSTEM-ON-CHIP TIMER FAILURE DETECTION AND RECOVERY USING INDEPENDENT REDUNDANT TIMERS

(71) Applicant: QUALCOMM Incorporated, San Diego, CA (US)

(72) Inventor: Kaushal Maheshkumar Purohit, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/204,191

(22) Filed: Mar. 17, 2021

(65) Prior Publication Data

US 2022/0300365 A1   Sep. 22, 2022

(51) Int. Cl.
*G06F 11/00* (2006.01)
*G06F 11/07* (2006.01)
*G06F 11/30* (2006.01)

(52) U.S. Cl.
CPC ...... *G06F 11/0757* (2013.01); *G06F 11/0772* (2013.01); *G06F 11/3075* (2013.01)

(58) Field of Classification Search
CPC .... G06F 11/183; G06F 11/1679; G06F 11/20; G06F 11/182; G06F 11/187
See application file for complete search history.

(56) References Cited

U.S. PATENT DOCUMENTS

| | | | |
|---|---|---|---|
| 7,526,551 B1 | 4/2009 | Islam et al. | |
| 9,733,664 B1 | 8/2017 | Graham et al. | |
| 2003/0079163 A1 | 4/2003 | Hashimoto et al. | |
| 2003/0196141 A1 | 10/2003 | Shaw | |
| 2004/0158759 A1* | 8/2004 | Chang | G06F 1/06 713/503 |
| 2012/0117415 A1* | 5/2012 | Arumugham | G06F 11/1604 713/503 |
| 2014/0082434 A1 | 3/2014 | Knight et al. | |
| 2017/0269984 A1 | 9/2017 | Idapalapati et al. | |
| 2018/0114577 A1 | 4/2018 | Chakrabartty et al. | |
| 2018/0259577 A1* | 9/2018 | Kubota | G01R 31/31724 |
| 2019/0114235 A1* | 4/2019 | Wojewoda | G06F 11/142 |

OTHER PUBLICATIONS

Decusatis C., et al., "Metroplitan-Area Disater-Recovery Networks using Server time Protocol", Annual Review of Communications, National Engineering Consortium, Chicago, IL US, vol. 60, Jan. 1, 2007 (Jan. 1, 2007), pp. 663-665, XP001523111, ISSN: 0886-229X p. 663, col. 1, line 24-p. 664, col. 1, line 13.
International Search Report and Written Opinion—PCT/US2022/013609—ISA/EPO—dated May 12, 2022.

* cited by examiner

*Primary Examiner* — Charles Ehne
(74) *Attorney, Agent, or Firm* — The Marbury Law Group, PLLC

(57) ABSTRACT

Various embodiments include methods and devices for timer failure detection and recovery. The embodiments may include running a plurality of timers in parallel, including a first operation timer, a first monitor timer, and a second monitor timer each having an independent time base, determining whether a first timer of the plurality of timers fails, removing the first timer from use in response to determining that the first timer fails, determining whether the first timer has a consistent difference in independent time base with a second timer of the plurality of timers, and returning the timer to use with a time adjustment in response to determining that the first timer has a consistent difference in independent time base with the second timer.

28 Claims, 15 Drawing Sheets

SYSTEM-ON-CHIP TIMER FAILURE DETECTION AND RECOVERY USING INDEPENDENT REDUNDANT TIMERS

BACKGROUND

Clocks and timers play an important role in electronic devices and system that provide time critical functionality. An example of electronic systems providing time-critical functions are automotive systems that provide safety and autonomous driving functionality. Timer failures can cause hazardous effects in overall system functionality, such as in safety critical systems. Such safety-critical systems must have very high reliability. Therefore safety critical systems require the ability to detect timer failures with high precision so that appropriate actions can be taken. Conventionally, a failure results in reporting the failure to an overall safety management entity, transition of the system to a safe state and/or invoking a recovery mechanism. Systems suffering timer failures can trigger frequent transitions to the safe state and recovery, which can be expensive when a recovery is a reset and reboot of the affected system. Such degradation of system function is not feasible for many time critical systems.

SUMMARY

Various disclosed aspects may include apparatuses and methods of timer failure detection and recovery. Various aspects may include running a plurality of timers in parallel, having at least a first timer, a second timer, and a third timer, each having an independent time base, determining whether the first timer of the plurality of timers fails, removing the first timer from use in response to determining that the first timer fails, determining whether the first timer has a consistent difference in independent time base with the second timer of the plurality of timers, and returning the first timer to use with a time adjustment in response to determining that the first timer has a consistent difference in independent time base with the second timer.

In some aspects, the first timer is a first operation timer and the third timer is a monitor timer. Some aspects may include converting the monitor timer to a second operation timer.

In some aspects, converting the monitor timer to the second operation timer may occur within a fault tolerant interval for a time critical system.

In some aspects, the first timer may be an operation timer, and returning the first timer to use in response to determining that the first timer has a consistent difference in independent time base with the second timer may include returning the operation timer to use as a monitor timer.

In some aspects, the first timer may be a monitor timer, and returning the first timer to use in response to determining that the first timer has a consistent difference in independent time base with the second timer may include returning the monitor timer to use as the monitor timer.

Some aspects may include adjusting the independent time base of the first timer as the time adjustment using the consistent difference in independent time base with the second timer in response to determining that the first timer has a consistent difference in independent time base with the second timer.

Some aspects may include determining whether the first timer has a consistent difference in independent time base with the third timer of the plurality of timers, and returning the first timer to use with a time adjustment in response to determining that the first timer has a consistent difference in independent time base with the third timer.

Further aspects include a computing device having a plurality of timers and a timer control device configured to perform operations of any of the methods summarized above. Further aspects include a computing device having means for performing functions of any of the methods summarized above. Further aspects include a non-transitory processor-readable medium having stored thereon processor-executable instructions configured to cause an integrated circuit to perform operations of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
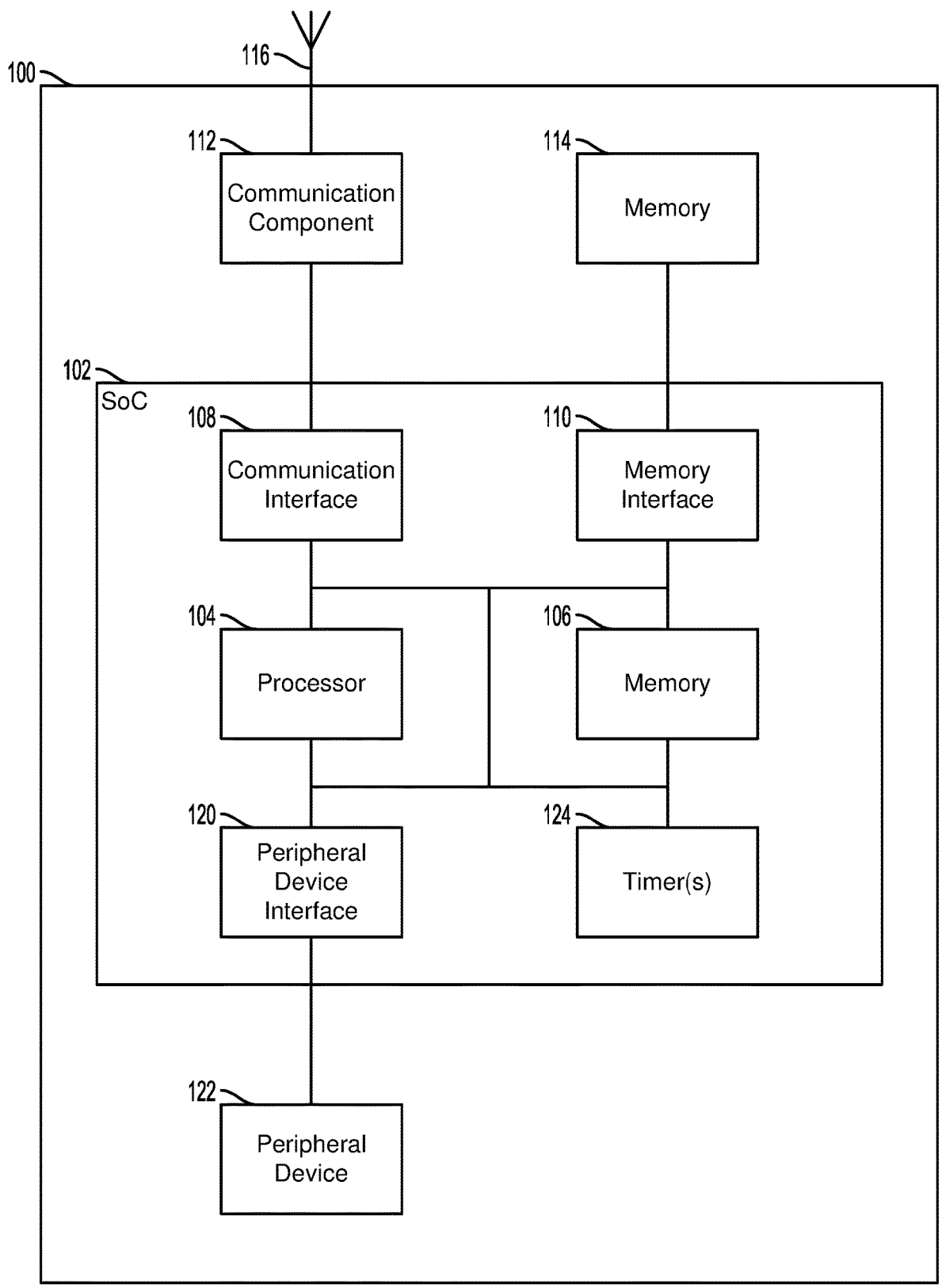
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of system on chip (SoC) timer failure detection and recovery using independent redundant timers. Various embodiments may include using multiple monitor timers to monitor a first operation timer. Various embodiments may include replacing a failed first operation timer with a first monitor timer as a functioning second operation timer and using a second monitor timer to monitor the second operation timer. Various embodiments may include determining whether a time difference between the failed first operation timer and the second operation timer and/or between the failed first operation timer and the second monitor timer is consistent. Various embodiments may include using the failed first operation timer with a time adjustment as a monitor timer of the second operation timer in response to determining that the time difference between the failed first operation timer and the second operation timer and/or between the failed first operation timer and the second monitor timer is consistent.

Various embodiments may include using multiple timers, a monitor timer(s) and an operation timer to monitor a monitor timer. Various embodiments may include determining whether a time difference between a failed first monitor timer and the first operation timer and/or between the failed first monitor timer and the second monitor timer is consistent, and using the failed first monitor timer, with a time adjustment, as the first monitor timer in response to determining that the time difference between the failed first monitor timer and the first operation timer and/or between the failed first monitor timer and the second monitor timer is consistent.

The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor. The term "computing device" may further refer to stationary computing devices including personal computers, desktop computers, all-in-one computers, workstations, super computers, mainframe computers, embedded computers (such as in vehicles and other larger systems), servers, multimedia computers, and game consoles.

Timer failures can cause hazardous effects in overall system functionality, such as in time critical system (e.g., vehicular systems, such as automotive, avionic, marine etc., medical systems, healthcare systems, manufacturing systems, financial systems, etc.) that make use of timers to control functions. Such time critical systems must have very high reliability. Therefore, time critical systems require the ability to detect timer failures with high precision so that appropriate actions can be taken. Conventionally, a failure results in reporting the failure to an overall safety management entity, transition of the system to a safe state and/or invoking a recovery mechanism. Systems suffering timer failures can trigger frequent transitions to the safe state and recovery, which can be expensive when a recovery is a reset and reboot of the affected system. Such degradation of system function is not feasible for many time critical systems.

Various embodiments solve the foregoing problems providing an intermediate level of inexpensive recovery by implementing multiple independent timers running in parallel. A time critical system may include multiple independent timers running in parallel, including at least one operation timer (e.g., a first operation timer) and at least two monitor timers (e.g., a first monitor timer and a second monitor timer). Each of the timers may be free from interference from the other timers at a hardware level, a software level, and a physical layout and logical level. The operation timer may execute periodic functions on different time slices. In some embodiments, the monitor timers may detect failure of the operation timer. In some embodiments, the operation timer and the second monitor timer may detect failure of the first monitor timer. Each timer may run on a different independent time base (ITB). Time stamps of the different timers may be used to compare the independent time bases of the timers to check for failure of the timers.

When the first operation timer fails, the first monitor timer may be transitioned to be a second operation timer. The second monitor timer may be used to monitor the second operation timer for failure. The time critical system may continue to operate without having to transition to a safe state and implement an expensive recovery process, which may avoid degradation of system function for the time critical system. In some embodiments, the failed first operation timer may be transitioned to be a third monitor timer by implementing a time adjustment consistent with the a consistent difference between the first operation timer and the first monitor timer, which enables maintaining multiple timer based operation timer failure detection and recovery after one timer failure is detected.

In embodiments in which the first monitor timer fails, the second monitor timer may continue to be used to monitor the first operation timer for failure. The time critical system may continue to operate without having to transition to a safe state and implement an expensive recovery process, which may avoid degradation of system function for the time critical system. In some embodiments, the failed first monitor timer may continue to be used as the first monitor timer with a time adjustment, maintaining the multiple timer based operation timer and monitor timer failure detection and recovery.

Implementing multiple timers configured to monitor other timers may provide greater rates of timer failure detection and redundancy for improved diagnostics. Replacing a failed operation timer with a monitor timer allows for inexpensive recovery from the failed operation timer by avoiding transition to a safe state and implementation of an expensive recovery process, such a reset and/or reboot. Faster recovery from a failed operation timer may avoid degradation of system function for a time critical system.

FIG. 1 illustrates a system including a computing device 100 suitable for use with various embodiments. The computing device 100 may include an SoC 102 with a processor 104, a memory 106, a communication interface 108, a memory interface 110, a peripheral device interface 120, and a timer 124. The computing device 100 may further include a communication component 112, such as a wired or wireless modem, a memory 114, an antenna 116 for establishing a wireless communication link, and/or a peripheral device 122. The processor 124 may include any of a variety of processing devices, for example a number of processor cores.

The term "system-on-chip" or "SoC" is used herein to refer to a set of interconnected electronic circuits typically, but not exclusively, including a processing device, a memory, and a communication interface. A processing device may include a variety of different types of processors 104 and/or processor cores, such as a general purpose processor, a central processing unit (CPU), a digital signal processor (DSP), a graphics processing unit (GPU), an accelerated processing unit (APU), a secure processing unit (SPU), an intellectual property unit (IPU), a subsystem processor of specific components of the computing device, such as an image processor for a camera subsystem or a display processor for a display, an auxiliary processor, a peripheral device processor, a single-core processor, a multicore processor, a controller, and/or a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and/or time references. Integrated circuits may be configured such that the components of the integrated circuit reside on a single piece of semiconductor material, such as silicon.

An SoC 102 may include one or more processors 104. The computing device 100 may include more than one SoC 102, thereby increasing the number of processors 104, and processor cores. The computing device 100 may also include processors 104 that are not associated with an SoC 102. Individual processors 104 may be multicore processors. The processors 104 may each be configured for specific purposes that may be the same as or different from other processors 104 of the computing device 100. One or more of the processors 104, and processor cores of the same or different configurations may be grouped together. A group of processors 104, or processor cores may be referred to as a multi-processor cluster.

The memory 106 of the SoC 102 may be a volatile or non-volatile memory configured for storing data and processor-executable code for access by the processor 104, or other components of SoC 102. The computing device 100 and/or SoC 102 may include one or more memories 106 configured for various purposes. One or more memories 106 may include volatile memories such as random-access memory (RAM) or main memory, or cache memory. These memories 106 may be configured to temporarily hold a limited amount of data received from a data sensor or subsystem, data and/or processor-executable code instructions that are requested from non-volatile memory, loaded to the memories 106 from non-volatile memory in anticipation of future access based on a variety of factors, and/or intermediary processing data and/or processor-executable code instructions produced by the processor 104 and temporarily stored for future quick access without being stored in non-volatile memory. In some embodiments, any number and combination of memories 106 may include one-time programmable or read-only memory.

The memory 106 may be configured to store data and processor-executable code, at least temporarily, that is loaded to the memory 106 from another memory device, such as another memory 106 or memory 114, for access by one or more of the processor 104 or other components of SoC 102. The data or processor-executable code loaded to the memory 106 may be loaded in response to execution of a function by the processor 104, or other components of SoC 102. Loading the data or processor-executable code to the memory 106 in response to execution of a function may result from a memory access request to the memory 106 that is unsuccessful, or a "miss," because the requested data or processor-executable code is not located in the memory 106. In response to a miss, a memory access request to another memory 106 or memory 114 may be made to load the requested data or processor-executable code from the other memory 106 or memory 114 to the memory 106. Loading the data or processor-executable code to the memory 106 in response to execution of a function may result from a memory access request to another memory 106 or memory 114, and the data or processor-executable code may be loaded to the memory 106 for later access.

The memory interface 110 and the memory 114 may work in unison to allow the computing device 100 to store data and processor-executable code on a volatile and/or non-volatile storage medium, and retrieve data and processor-executable code from the volatile and/or non-volatile storage medium. The memory 114 may be configured much like an embodiment of the memory 106 in which the memory 114 may store the data or processor-executable code for access by one or more of the processor 104, or other components of SoC 102. In some embodiments, the memory 114, being non-volatile, may retain the information after the power of the computing device 100 has been shut off. When the power is turned back on and the computing device 100 reboots, the information stored on the memory 114 may be available to the computing device 100. In some embodiments, the memory 114, being volatile, may not retain the information after the power of the computing device 100 has been shut off. The memory interface 110 may control access to the memory 114 and allow the processor 104, or other components of the SoC 12 to read data from and write data to the memory 114.

The timer 124 may include any number and combination of timers 124. The timer 124 may be configured to count an interval, which may be predetermined or calculated. The timer 124 may be configured to issue a trigger signal or an interrupt signal to the processor 104, or other components of SoC 102, upon completion of the interval. The signal may prompt the component receiving the signal to implement a function. The interval may be configurable for different processors 104, other components of SoC 102, and/or applications.

Some or all of the components of the computing device 100 and/or the SoC 102 may be arranged differently and/or combined while still serving the functions of various embodiments. The computing device 100 may not be limited to one of each of the components, and multiple instances of each component may be included in various configurations of the computing device 100.

Figure 2:
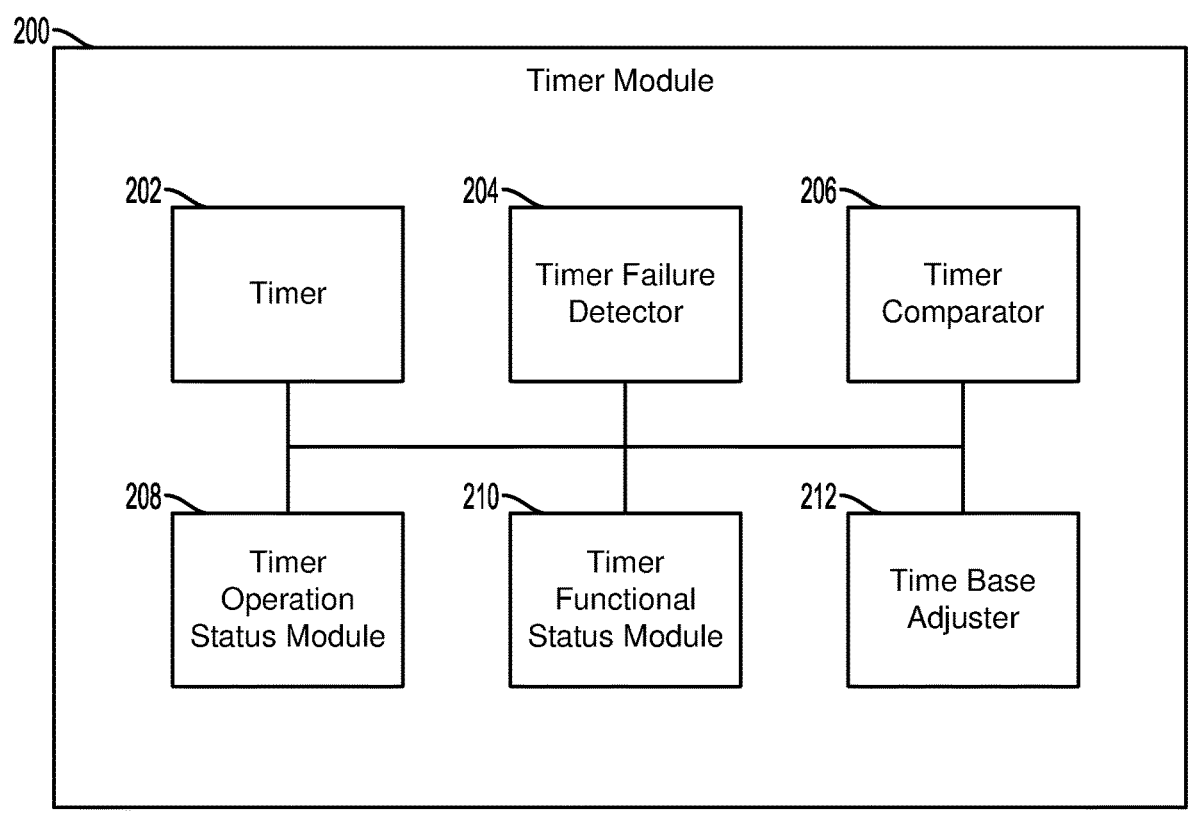
FIG. 2 is a component block diagram illustrating example timer module suitable for implementing various embodiments.

FIG. 2 illustrates components of a timer module 200 (e.g., timer 124 in FIG. 1) of an integrated circuit, such as an SOC 102 (FIG. 1) suitable for implementing some embodiments. With reference to FIGS. 1 and 2, the integrated circuit may include any number and combination of timer modules 200. The timer module 200 may include hardware and/or software components, including any number and combination of timers 202, timer failure detectors 204, timer comparators 206, timer operation status modules 208, timer functional status modules 210, and time based adjusters 212.

A timer 202 may be configured to count an interval, which may be predetermined or calculated. The timer 124 may be configured to issue a trigger signal or an interrupt signal to a processor (e.g., processor 104 in FIG. 1) or other components of the integrated circuit, such as components of an SoC (e.g., SoC 102 in FIG. 1), upon completion of counting the interval. The signal may prompt the component receiving the signal to implement a function. The interval may be configurable for different processors, other components of the integrated circuit, and/or applications.

In some embodiments, the timer 202 may be configured to count any number and combination of intervals. In some embodiments, multiple timers 202 may be implemented by the timer module 200. In some embodiments, different timers 202 may be configured with different intervals. In some embodiments, the timer 202 may be configured to store values of any number and combinations of intervals and/or counts to a memory (not shown), such as a memory integral to the timer module 200, such as integral to the timer 202, and/or a memory separate from the timer module 200 (e.g., memory 116 in FIG. 1). In some embodiments, different timers 202 may operate on independent time bases.

A timer comparator 206 may compare at least two timers 202. The timer comparator 206 may compare independent time bases of the at least two timers 202. The timer comparator 206 may determine or calculate a difference between the independent time bases of the at least two timers 202. Any number and combination of timer comparators 206 may be implemented. As another example, a timer comparator 206 may be configured to determine the difference between the independent time bases of a timer 202 and any number and combination of other timers 202. As another example, a timer comparator 206 may be configured to determine the differences between various timers 202. As another example, each of multiple timer comparators 206 may be configured to determine the difference between the independent time bases of an associated timer 202 and any number and combination of other timers 202. In some embodiments, the timer comparator 206 may share the results of a comparison with any number and combination of timer failure detectors 204. In some embodiments, the timer comparator 206 may share the results of a comparison with any number and combination of time based adjusters 212. The timer comparator 206 may be configured to compare the independent time bases of timers 202 periodically, based on an event, and/or continuously.

A timer failure detector 204 may be configured to monitor and detect whether a timer 202 has failed. The timer failure detector 204 may be configured to detect whether a timer 202 has failed by any of various known means. Any number and combination of timer failure detectors 204 may be implemented. For example, a timer failure detector 204 may be configured to determine whether a timer 202 has failed by results of comparison of the timer 202 to at least one other timer 202. As another example, a timer failure detector 204 may be configured to determine whether a timer 202 has failed by results of comparisons of various timers 202. As another example, each of multiple timer failure detectors 204 may be configured to determine whether a timer 202 has fail by results of comparison of the timer 202 to a timer 202 associated with a timer failure detector 204 and sharing the determination of whether the timer 202 has failed with other timer failure detectors 204. In some embodiments, the results of the comparisons between timers 202 may be provided to the timer failure detector 204 by a timer comparator 206. The timer failure detector 204 may be configured to monitor and detect whether a timer 202 has failed periodically, based on an event, and/or continuously.

The timer failure detector 204 may further determine whether a failed timer 202 may still be used with a time base adjustment. The timer failure detector 204 may use the results of the comparison of a failed timer 202 to other timers 202 to determine whether the failed timer 202 may still be used with a time base adjustment. For example, the timer failure detector 204 may determine whether the results of comparisons of the failed timer 202 to at least one other timer 202 are consistent. The results of the comparisons may be consistent by exhibiting no variance or variance within a threshold over a period. In some embodiments, the period may be a time interval. In some embodiments, the period may be a number of iterations of comparisons.

The determination by the timer failure detector 204 that a timer 202 has failed may be signaled by the timer failure detector 204 to any number and combination of timer operation status modules 208. The determination made by the timer failure detector 204 that a failed timer 202 may still be used with a time base adjustment may be signaled by the timer failure detector 204 to any number and combination of timer operation status modules 208 and to any number and combination of time based adjusters 212. The timer failure detector 204 may signal a determination that the failed timer 202 may not still be used to any number and combination of timer functional status modules 210.

A timer operation status module 208 may modify and/or store an operation status associated with any number and combination of timers 202. The operation status of a timer 202 may include, a status as an operation timer, a monitor timer, and a failed timer. The operation timer status may indicate to any number and combination of timer failure detectors 204 that a timer 202 is to be monitored relative to the timers 202 having monitor timer status. The operation timer status may also indicate to a timer 202 to issue a trigger signal or an interrupt signal to a processor or other components of the integrated circuit upon completion of counting the interval. The monitor timer status may indicate to any number and combination of timer failure detectors 204 that a timer 202 is to be monitored relative to the timer 202 having operation timer status and to the other timers 202 having monitor timer status. The failed timer status may indicate to any number and combination of timer failure detectors 204 that a timer 202 is to be evaluated for whether the timer 202 may still be used with a time base adjustment. The timer operation status module 208 may modify and/or store an operation status in a memory (not shown), such as a memory integral to the timer module 200, such as integral to the timer operation status module 208, and/or a memory separate from the timer module 200 (e.g., memory 116 in FIG. 1). The timer operation status module 208 may be implemented for any number and combination of timers 202. For example, the timer operation status module 208 modify and/or store the operation status for an associated timer 202. As another example, the timer operation status module 208 modify and/or store the operation statuses in association with multiple timers 202. Any number and combination of timer operation status modules 208 may be implemented.

A timer functional status module 210 may modify and/or store a functional status associated with any number and combination of timers 202. The functional status of a timer 202 may include, a status as a nonfunctional timer. The functional status may indicate to any number and combination of timer failure detectors 204 and timer comparators 206 that a timer 202 is not to be monitored or compared. The timer functional status module 210 may modify and/or store a functional status in a memory (not shown), such as a memory integral to the timer module 200, such as integral to the timer functional status module 210, and/or a memory separate from the timer module 200 (e.g., memory 116 in FIG. 1). The timer functional status module 210 may be implemented for any number and combination of timers 202. For example, the timer functional status module 210 modify and/or store the functional status for an associated timer 202. As another example, the timer functional status module 210 modify and/or store the functional statuses in association with multiple timers 202. Any number and combination of timer functional status modules 210 may be implemented.

A time base adjuster 212 may implement a time base adjustment for any number and combination of timers 202 for which the timer failure detector 204 has indicated that a timer 202 may still be used with a time base adjustment. The time base adjuster may adjust the independent time base of the timer 202 with a monitor timer operation status as indicated by the timer operation status module 208. The independent time base for the timer 202 may be adjusted based on the difference between the independent time bases of the timer 202 and at least one other timer 202, as described further herein. The independent adjusted time base of the timer 202 may be used by the timer comparator to make comparisons of the independent time base of the timer 202 compared to the independent time base of at least one other timer 202. Any number and combination of time base adjusters 212 may be implemented for any number and combination of detector timers 202.

FIGS. 3A-4D illustrate an example of SoC timer failure detection and recovery using independent redundant timers for implementing various embodiments. With reference to FIGS. 1-4D, system on chip (SoC) timer failure detection and recovery may be implemented on an integrated circuit, such as an SOC 102 (FIG. 1) via an independent redundant timer system 300 that may be implemented in hardware and/or software (e.g., processor 104, timer 124 in FIG. 1, timer module 200, timer 202, timer failure detector 204, timer comparator 206, timer operation status module 208, timer functional status module 210, time based adjuster 212 in FIG. 2).

The independent redundant timer system 300 may include at least three independent timers 302a, 302b, 302c, 402a, 402b, 402c (e.g., timer 124 in FIG. 1, timer module 200, timer 202, timer failure detector 204, timer comparator 206, timer operation status module 208, timer functional status module 210, time based adjuster 212 in FIG. 2), running in parallel, including at least one operation timer and at least one monitor timer. Some embodiments may include at least two monitor timers. Each of the timers 302a, 302b, 302c, 402a, 402b, 402c may be free from interference from the other timers 302a, 302b, 302c, 402a, 402b, 402c at a hardware level, a software level, and a physical layout and logical level. The operation timer may execute periodic functions, such as transmitting interrupt signals and/or trigger signals to a processor or other components of an SoC (e.g., SoC 102, processor 104 in FIG. 1) on different time slices. The monitor timers may detect failure of the operation timer. As described further herein, the operation status and the functional status of the timers 302a, 302b, 302c, 402a, 402b, 402c may change based on various factors, changing which timer 302a, 302b, 302c, 402a, 402b, 402c is an operation timer, a monitor timer, or a nonfunctional timer.

Each timer 302a, 302b, 302c, 402a, 402b, 402c may run on a different independent time base (ITB0, ITB1, ITB2). The timers 302a, 302b, 302c, 402a, 402b, 402c may transmit and receive timestamps 304a, 304b, 304c, 404a, 404b, 404c from the other timers 302a, 302b, 302c, 402a, 402b, 402c. For example, a monitor timer may receive timestamps from operation timers and from other monitor timers, and transmit the timestamp of the monitor timer. An operation timer may transmit the timestamp of the operation timer to the monitor timers. Timestamps 304a, 304b, 304c, 404a, 404b, 404c of the different timers 302a, 302b, 302c, 402a, 402b, 402c may be compared to check for failure of the other timers 302a, 302b, 302c, 402a, 402b, 402c.

While FIGS. 3A-3D and 4A-4D illustrate different examples, the examples are not mutually exclusive, and may be combined. As such, the like timers 302a, 302b, 302c, 402a, 402b, 402c may function in manners similar to the descriptions of the examples of FIGS. 3A-3D and 4A-4D. For example, while FIGS. 3A-3D illustrate example timers 302a, 302b, 302c for which monitor timers monitor an operation timer for failure, the timers 302a, 302b, 302c may additionally function as the example timers 402a, 402b, 402c illustrated in FIGS. 4A-4D for which an operation timer and monitor timers may monitor a monitor timer for failure. As another example, while FIGS. 4A-4D illustrate example timers 402a, 402b, 402c for which an operation timer and monitor timers may monitor a monitor timer for failure, the timers 402a, 402b, 402c may additionally function as the example timers 302a, 302b, 302c illustrated in FIGS. 3A-3D for which monitor timers monitor an operation timer for failure.

Figure 3A:
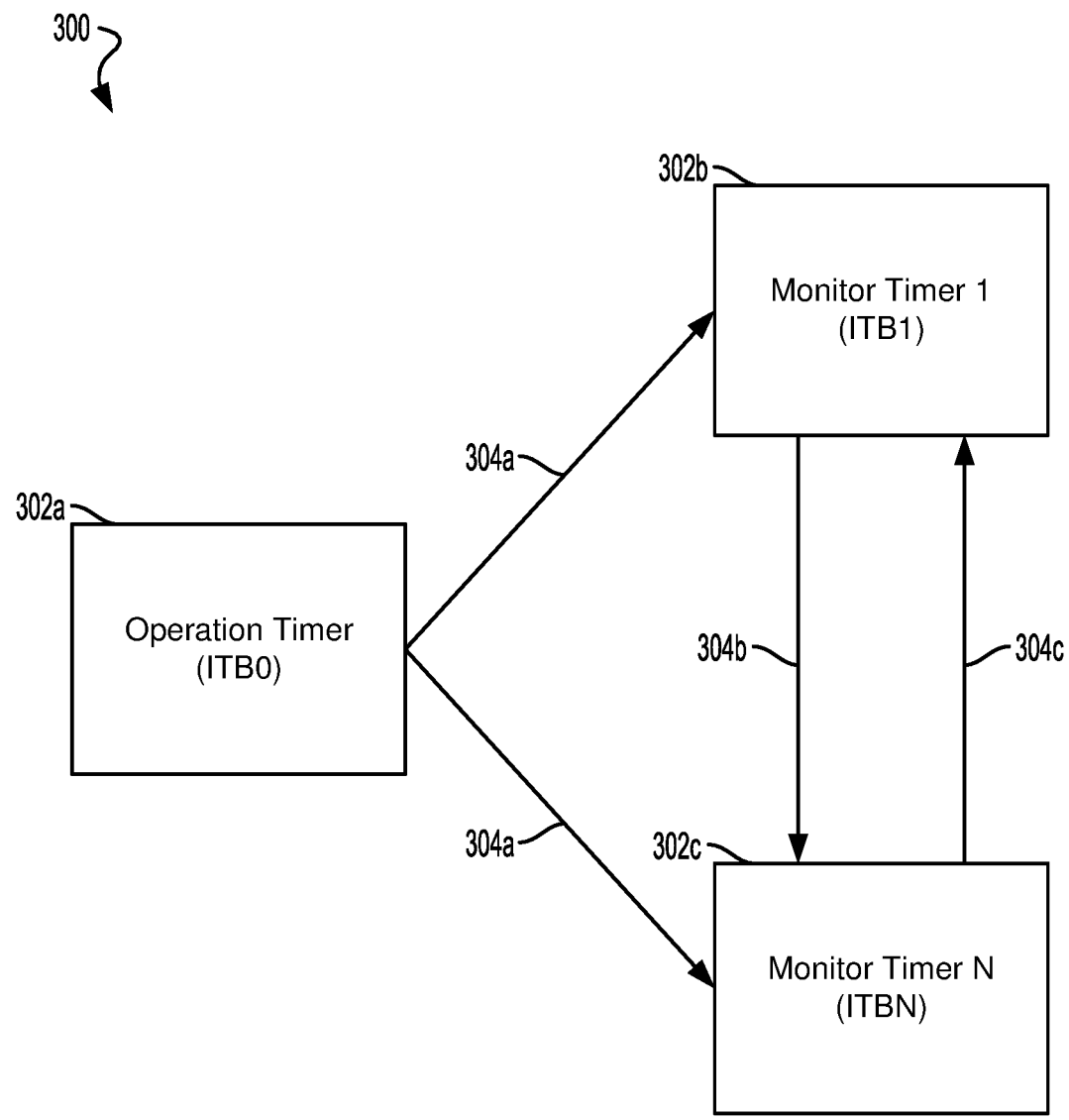
FIGS. 3A-3D are block diagrams illustrating an example of system on chip (SoC) timer failure detection and recovery using independent redundant timers suitable for implementing various embodiments.

FIGS. 3A-3D illustrate examples of using monitor timers to monitor an operation timer. FIG. 3A illustrates an example of the independent redundant timer system 300 having a first operation timer 302a running on ITB0, a first monitor timer 302b running on ITB1, and a second monitor timer 302c running on ITB2. Each of the timers 302a, 302b, 302c may have a corresponding operation status, operation timer status for the first operation timer 302a, and monitor timer status for the first monitor timer 302b and the second monitor timer 302c. None of the timers 302a, 302b, 302c, may have a functional status of nonfunctional.

The first operation timer 302a may transmit a timestamp 304a to the first monitor timer 302b and the second monitor timer 302c. The first monitor timer 302b may transmit a timestamp 304b to the second monitor timer 302c, and the second monitor timer 302c may transmit a timestamp 304c to the first monitor timer 302b. The first monitor timer 302b may compare the independent time bases of the first operation timer 302a, based on its timestamp 304a, and the first monitor timer 302b to determine whether the first operation timer 302a has failed. The second monitor timer 302c may compare the independent time bases of the first operation timer 302a, based on its timestamp 304a, and the second monitor timer 302c to determine whether the first operation timer 302a has failed. The first monitor timer 302b and/or the second monitor timer 302c may determine that the first operation timer 302a has failed based on comparison of the independent time bases resulting in a difference between the independent time bases. In some embodiments the difference between the independent time bases may be any difference between the independent time bases of the timers 302a, 302b, 302c. In some embodiments the difference between the independent time bases of the timers 302a, 302b, 302c may exceed a threshold.

Figure 3B:
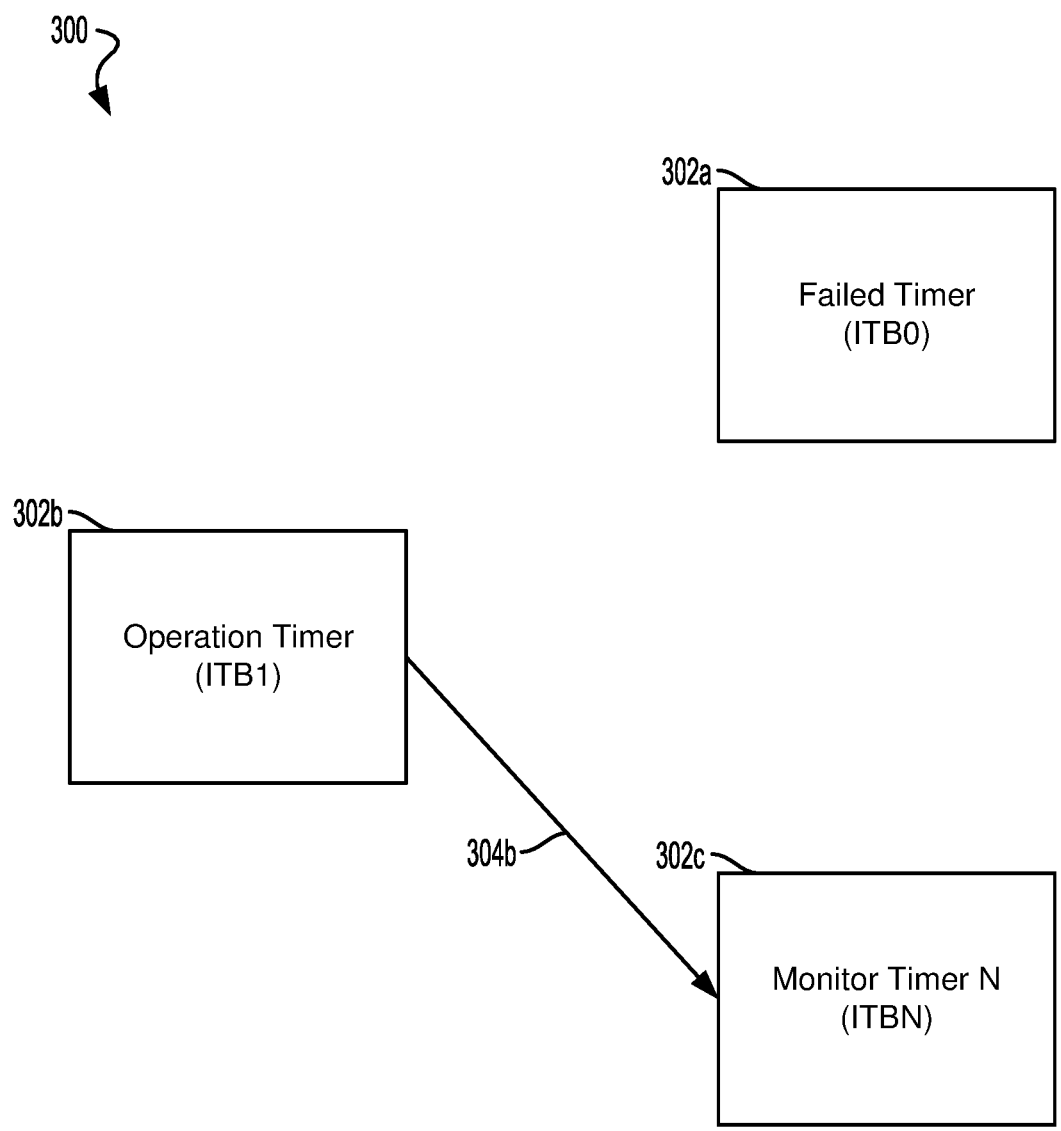

FIG. 3B illustrates an example of the independent redundant timer system 300 in which the first operation timer 302a in FIG. 3A is determined to have failed. The operation status of the timer 302a may be changed from operation timer status to failed timer status, making the first operation timer 302a in FIG. 3A a failed timer 302a in FIG. 3B. The transition in operation status of the failed timer 302a may leave the independent redundant timer system 300 without an operation timer. To avoid not having an operation timer, any of the monitor timers 302b, 302c in FIG. 3A may have their operation status changed from monitor timer status to operation timer status. In this example, the operation status of the timer 302b may be changed from monitor timer status to operation timer status, making the first monitor timer 302b in FIG. 3A a second operation timer 302b in FIG. 3B. The change from the first operation timer 302a and the first monitor timer 302b in FIG. 3A to the failed timer 302a and the second operation timer 302b in FIG. 3B may occur within a fault tolerant time interval of a time critical system. The second operation timer 302b may send the time stamp 304b to the second monitor timer 302c, which may monitor the second operation timer 302b for failure.

The failed timer 302a may be evaluated to determine whether it may be used as a monitor timer or remain removed from use. The independent time base of the failed timer 302a (ITB0) may be compared to the independent time base of the second operation timer 302b (ITB1) and/or to the independent time bases of the second monitor timer 302c (ITB2). These comparisons may determine whether there is a difference between the independent time base of the failed timer 302a and the independent time base of the second operation timer 302b ($\Delta 1$) and/or a difference between the independent time base of the failed timer 302a and the independent time base of the second monitor timer 302c ($\Delta 2$). Whether the independent time base differences $\Delta 1$ with the second operation timer 302b and/or $\Delta 2$ with monitor the second monitor timer 302c are consistent may be determined over time. For example, whether ITB0+/−$\Delta 1$=ITB1 and/or ITB0+/−$\Delta 2$=ITB2 may be repeatedly determined until there is sufficient confidence that the independent time base differences are consistent, e.g., over a defined number of iterations, deterministic time interval, etc.

Figure 3C:
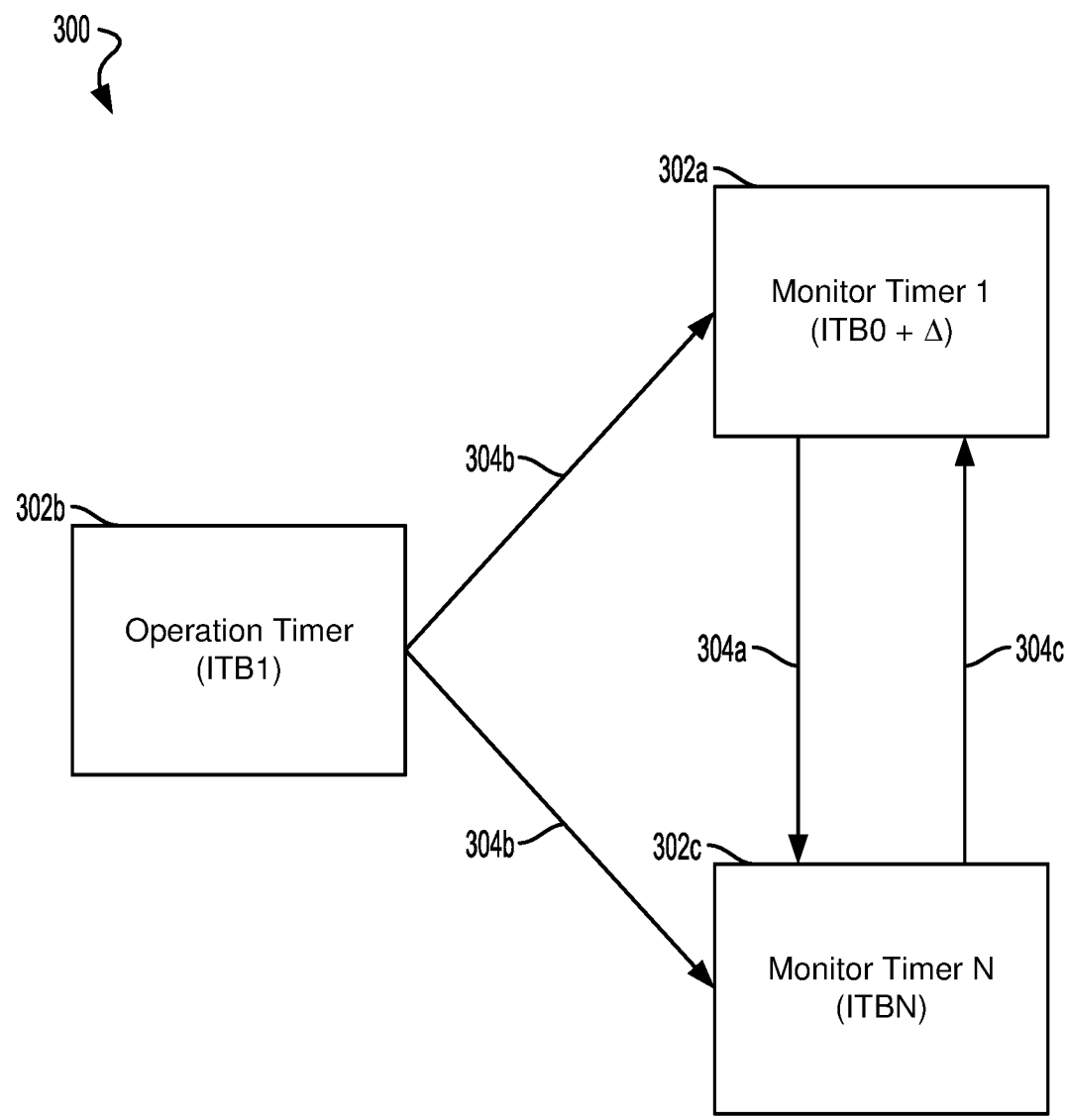

FIG. 3C illustrates an example of the independent redundant timer system 300 in which the failed timer 302a in FIG. 3B is determined to have consistent independent time base differences $\Delta 1$ with the second operation timer 302b and/or $\Delta 2$ with monitor the second monitor timer 302c. In response to determining a consistent independent time base difference $\Delta 1$ with the second operation timer 302b and/or $\Delta 2$ with monitor the second monitor timer 302c, the operation status of the failed timer 302a in FIG. 3B may be changed from failed timer status to monitor timer status, making the failed timer 302a in FIG. 3B a third monitor timer 302a in FIG. 3C. The third monitor timer 302a may assume the duties of a monitor timer to monitor the operation timer, such as the second operation timer 302b, for failure. The second operation timer 302b may transmit the timestamp 304b to the third monitor timer 302a and the second monitor timer 302c. The third monitor timer 302a may transmit the timestamp 304a to the second monitor timer 302c, and the second monitor timer 302c may transmit the timestamp 304c to the third monitor timer 302c.

However, to account for the earlier failure of the timer 302a, the third monitor timer 302a may run on an adjusted independent time base. The adjusted independent time base for the third monitor timer 302a may be the independent time base of the failed timer 302a in FIG. 3B (ITB0) adjusted by the difference between the independent time bases of the failed timer 302a in FIG. 3B and of the second operation timer 302b ($\Delta 1$), e.g., ITB0+$\Delta 1$; or adjusted by the difference between the independent time bases of the failed timer 302a in FIG. 3B and of the second monitor timer ($\Delta 2$), e.g., ITB0+$\Delta 2$.

Figure 3D:
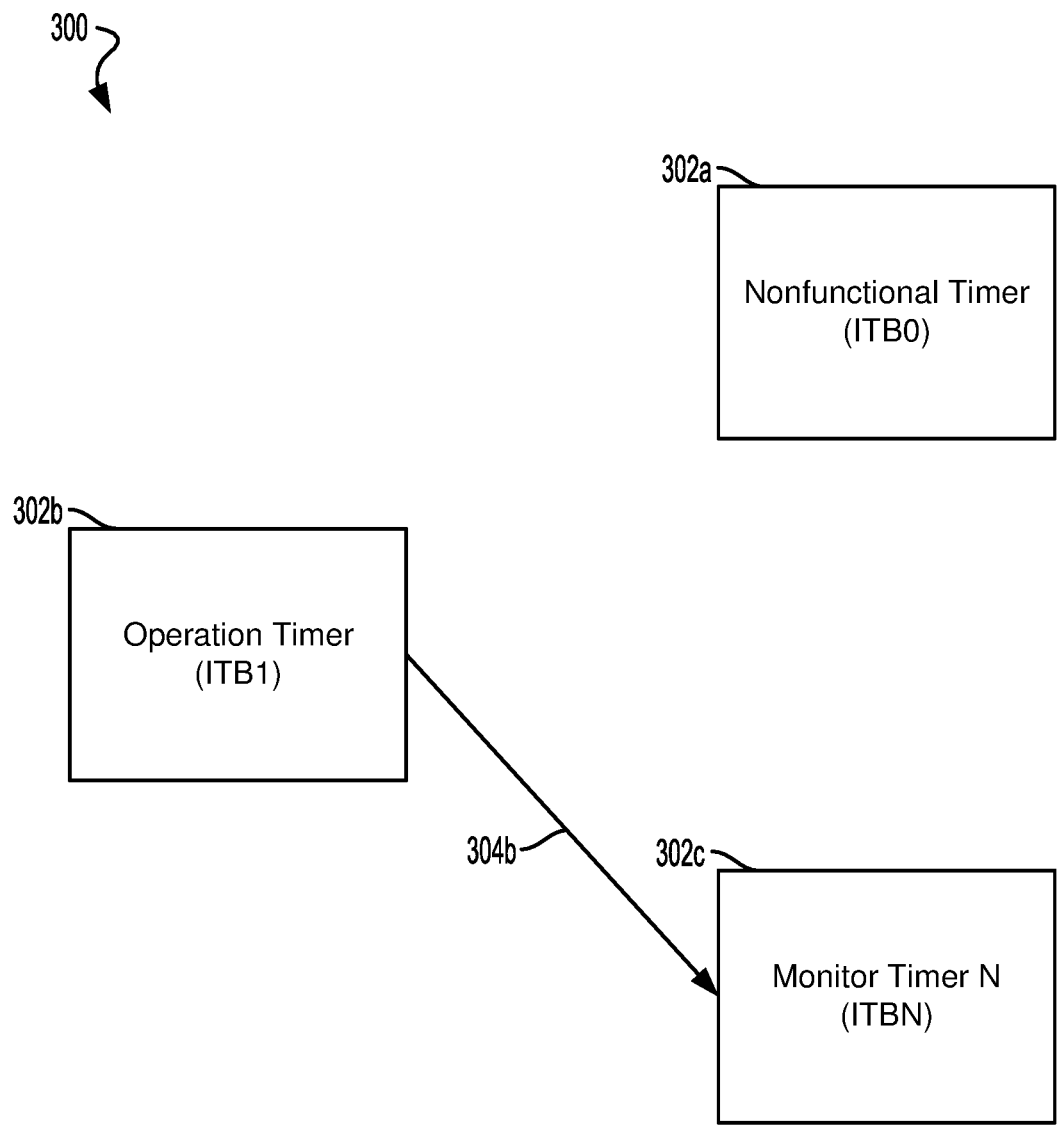

FIG. 3D illustrates an example of the independent redundant timer system 300 in which the failed timer 302a in FIG. 3B is determined not to have consistent independent time base differences $\Delta 1$ with the second operation timer 302b and/or $\Delta 2$ with monitor the second monitor timer 302c. In response to not determining a consistent independent time base difference $\Delta 1$ with the second operation timer 302b and/or $\Delta 2$ with monitor the second monitor timer 302c, the functional status of the failed timer 302a in FIG. 3B may be changed to nonfunctional status, making the failed timer 302a in FIG. 3B a nonfunctional timer 302a in FIG. 3D. As a nonfunctional timer, the nonfunctional timer 302a may be ignored by the rest of the independent redundant timer system 300. The nonfunctional timer 302a may be effectively removed from the independent redundant timer system 300 until the independent redundant timer system 300 is completely recovered. The second monitor timer 302c may continue to receive timestamps 304b from the second operation timer 302b, and to monitor the second operation timer 302b for failure.

Figure 4A:
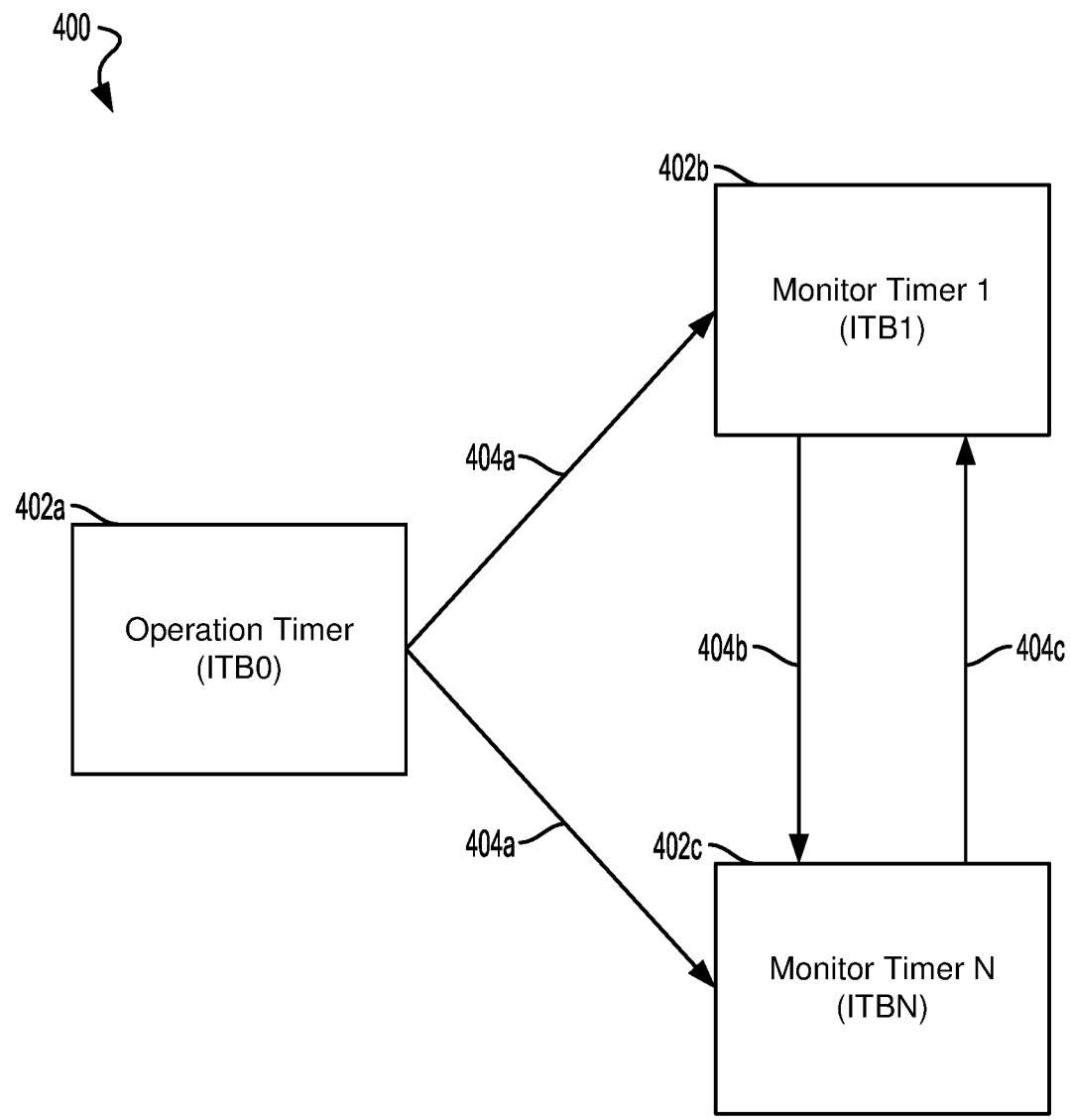
FIGS. 4A-4D are block diagrams illustrating an example of SoC timer failure detection and recovery using independent redundant timers suitable for implementing various embodiments.

FIGS. 4A-4D illustrate examples of using an operation timer and a monitor timer to monitor another monitor timer. FIG. 4A illustrates an example of the independent redundant timer system 400 having a first operation timer 402a running on ITB0, a first monitor timer 402b running on ITB1, and a second monitor timer 402c running on ITB2. Each of the timers 402a, 402b, 402c may have a corresponding operation status, operation timer status for the first operation timer 402a, and monitor timer status for the first monitor timer 402b and the second monitor timer 402c. None of the timers 402a, 402b, 402c, may have a functional status of nonfunctional.

The first operation timer 402a may transmit a timestamp 404a to the first monitor timer 402b and the second monitor timer 402c. The first monitor timer 402b may transmit a timestamp 404b to the second monitor timer 402c, and the second monitor timer 402c may transmit a timestamp 404c to the first monitor timer 402b. The first operation timer 402a may compare the independent time bases of the first monitor timer 402b, based on its timestamp 404b, and the first operation timer 402a to determine whether the first monitor timer 402b has failed. The second monitor timer 402c may compare the independent time bases of the first monitor timer 402b, based on its timestamp 404b, and the second monitor timer 402c to determine whether the first monitor timer 402b has failed. The first operation timer 402a and/or the second monitor timer 402c may determine that the first monitor timer 402b has failed based on comparison of the independent time bases resulting in a difference between the independent time bases. In some embodiments the difference between the independent time bases may be any difference between the independent time bases of the timers 402a, 402b, 402c. In some embodiments the difference between the independent time bases of the timers 402a, 402b, 402c may exceed a threshold.

Figure 4B:
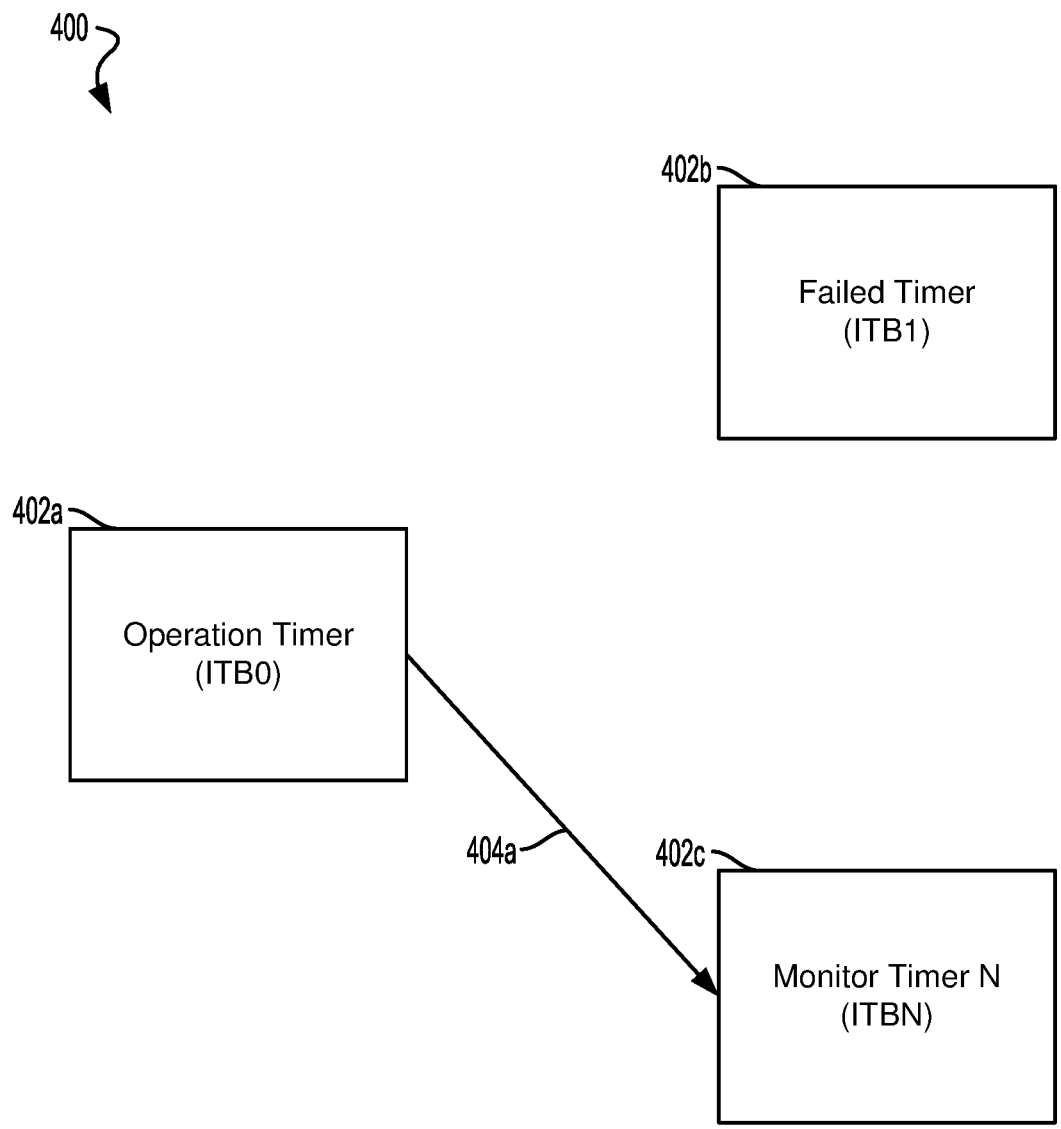

FIG. 4B illustrates an example of the independent redundant timer system 400 in which the first monitor timer 402b in FIG. 4A is determined to have failed. The operation status of the timer 402b may be changed from monitor timer status to failed timer status, making the first monitor timer 402b in FIG. 4A a failed timer 402b in FIG. 4B. The transition in operation status of the failed timer 402b may leave the independent redundant timer system 400 with fewer monitor timers. The independent redundant timer system 400 may avoid a full recovery as long as at least one monitor timers, such as the second monitor timer 402c remains operational.

The failed timer 402b may be evaluated to determine whether it may be brought back into use as a monitor timer or remain removed from use. The independent time base of the failed timer 402b (ITB1) may be compared to the independent time base of the first operation timer 402a (ITB0) and/or to the independent time bases of the second monitor timer 402c (ITB2). These comparisons may determine whether there is a difference between the independent time base of the failed timer 402b and the independent time base of the first operation timer 402a ($\Delta 3$) and/or a difference between the independent time base of the failed timer 402b and the independent time base of the second monitor timer 402c ($\Delta 4$). Whether the independent time base differences $\Delta 3$ with the first operation timer 402a and/or $\Delta 4$ with monitor the second monitor timer 402c are consistent may be determined over time. For example, whether ITB1+/−Δ3=ITB0+ITB2 and ITB1+/−Δ4=ITB0+ITB2 may be repeatedly determined until there is sufficient confidence that the independent time base differences are consistent, e.g., over a defined number of iterations, deterministic time interval, etc.

Figure 4C:
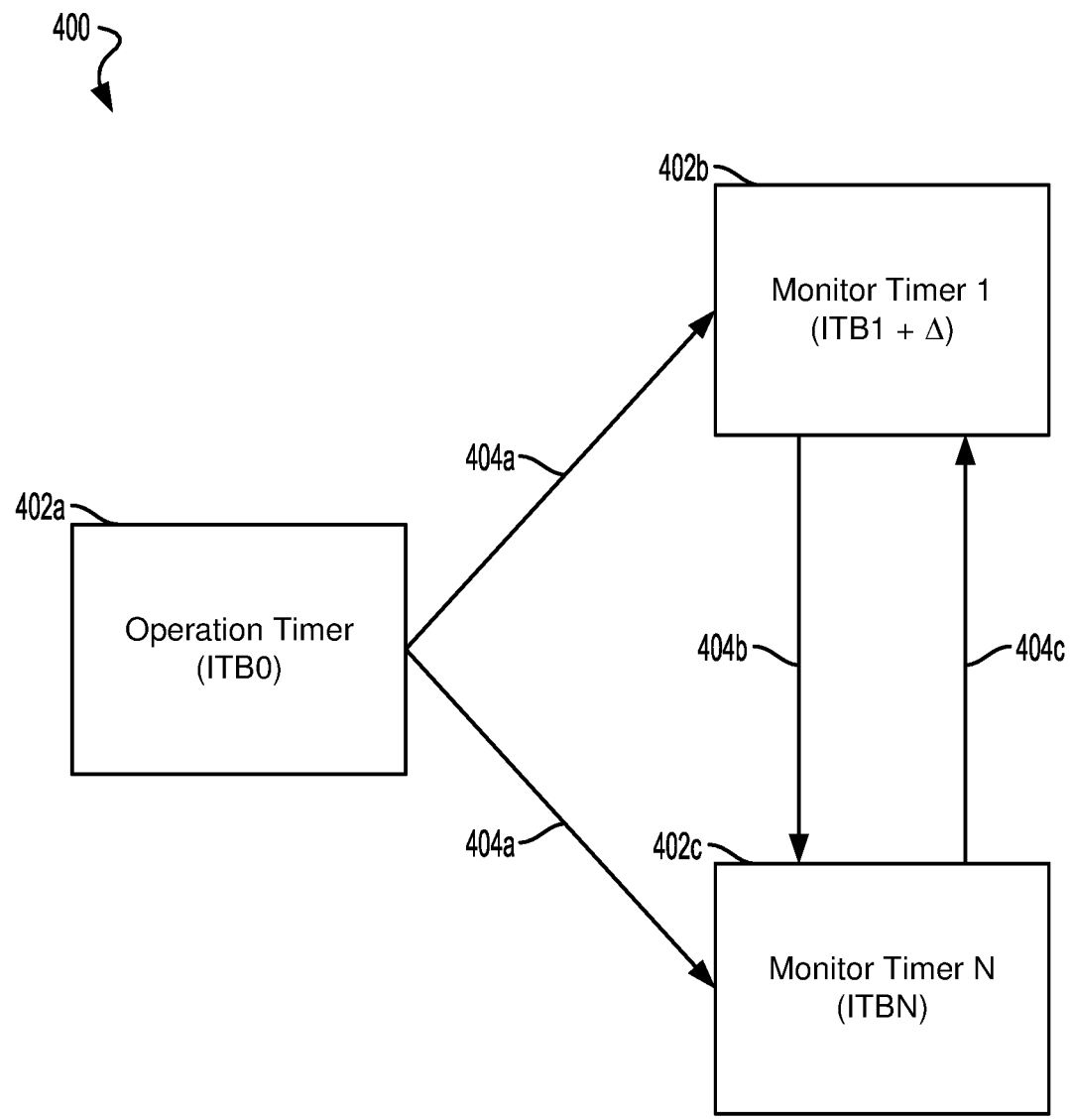

FIG. 4C illustrates an example of the independent redundant timer system 400 in which the failed timer 402b in FIG. 4B is determined to have consistent independent time base differences Δ3 with the first operation timer 402a and/or Δ4 with monitor the second monitor timer 402c. In response to determining a consistent independent time base difference Δ3 with the first operation timer 402a and/or Δ4 with monitor the second monitor timer 402c, the operation status of the failed timer 402b in FIG. 4B may be changed from failed timer status to monitor timer status, making the failed timer 402b in FIG. 4B the first monitor timer 402b again in FIG. 4C. The first monitor timer 402b may reassume the duties of a monitor timer to monitor other monitor timers, such as the second monitor timer 402c, for failure. The first operation timer 402a may transmit the timestamp 404a to the first monitor timer 402b and the second monitor timer 402c. The first monitor timer 402b may transmit the timestamp 404b to the second monitor timer 402c, and the second monitor timer 402c may transmit the timestamp 404c to the first monitor timer 402c.

However, to account for the earlier failure of the timer 402b, the first monitor timer 402b may run on an adjusted independent time base. The adjusted independent time base for the first monitor timer 402b may be the independent time base of the failed timer 402b in FIG. 4B (ITB1) adjusted by the difference between the independent time bases of the failed timer 402b in FIG. 4B and of the first operation timer 402a (Δ3), e.g., ITB1+Δ3; or adjusted by the difference between the independent time bases of the failed timer 402b in FIG. 4B and of the second monitor timer (Δ4), e.g., ITB1+Δ4.

Figure 4D:
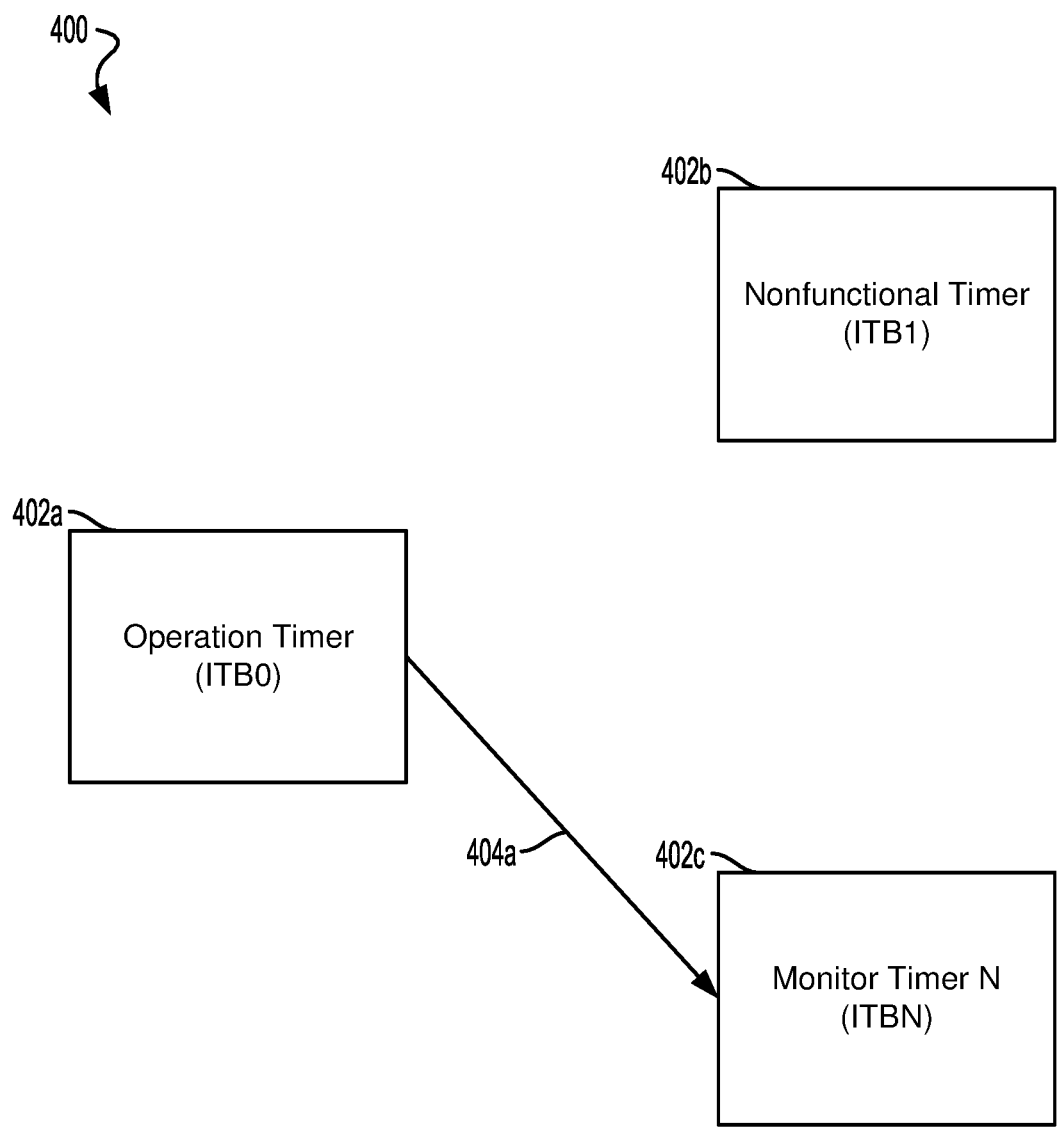

FIG. 4D illustrates an example of the independent redundant timer system 400 in which the failed timer 402b in FIG. 4B is determined not to have consistent independent time base differences Δ3 with the first operation timer 402a and/or Δ4 with monitor the second monitor timer 402c. In response to not determining a consistent independent time base difference Δ3 with the first operation timer 402a and/or Δ4 with monitor the second monitor timer 402c, the functional status of the failed timer 402b in FIG. 4B may be changed to nonfunctional status, making the failed timer 402b in FIG. 4B a nonfunctional timer 402b in FIG. 4D. As a nonfunctional timer, the nonfunctional timer 402b may be ignored by the rest of the independent redundant timer system 400. The nonfunctional timer 402b may be effectively removed from the independent redundant timer system 400 until the independent redundant timer system 400 is completely recovered. The second monitor timer 402c may continue to receive timestamps 404a from the first operation timer 402a, and to monitor the first operation timer 402a for failure.

Figure 5:
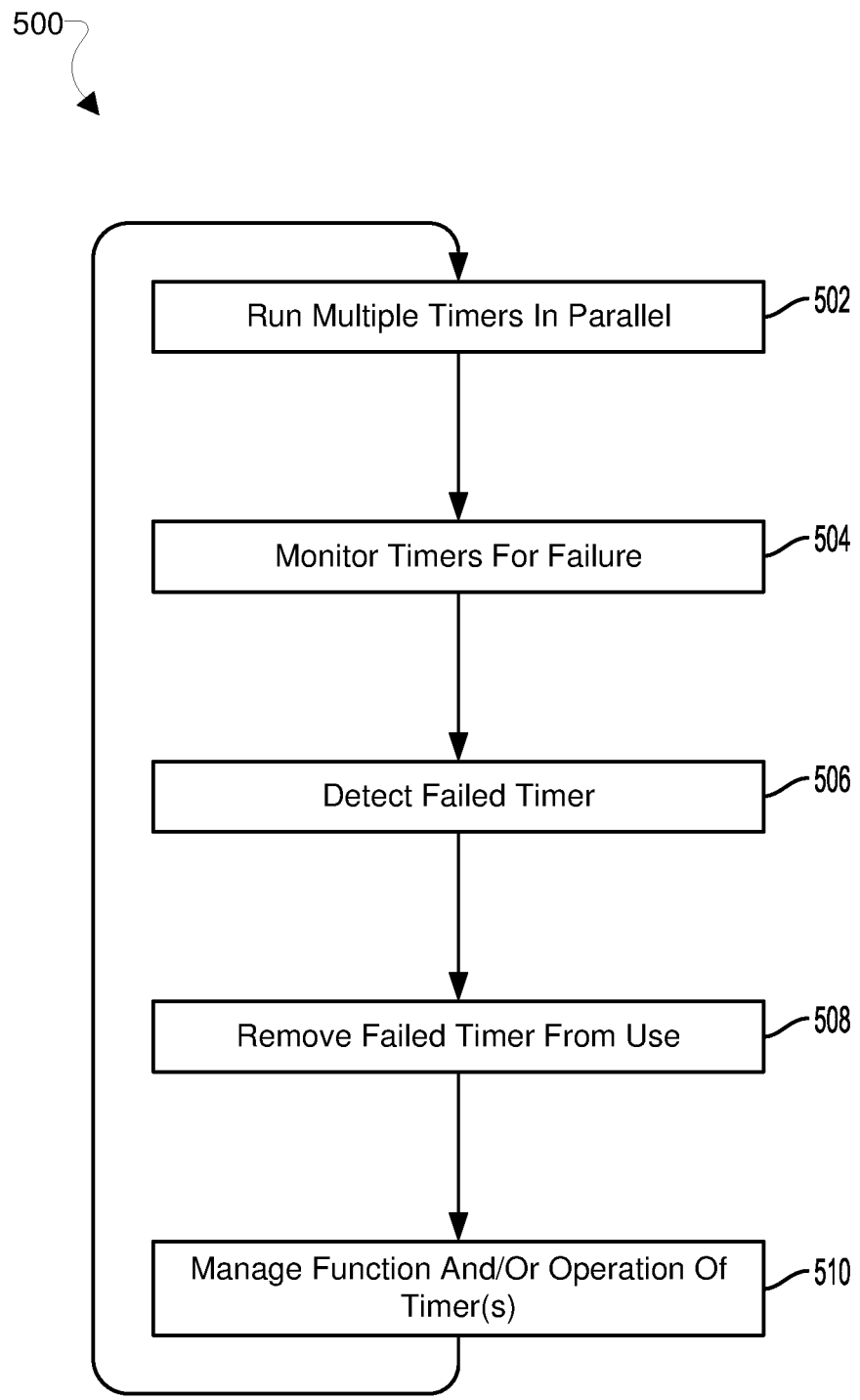
FIG. 5 is a process flow diagram illustrating a method of SoC timer failure detection and recovery using independent redundant timers according to an embodiment.

FIG. 5 illustrates a method 500 for SoC timer failure detection and recovery using independent redundant timers according to an embodiment. With reference to FIGS. 1-5, the method 500 may be implemented in an integrated circuit (e.g., SoC 102) or a component within an integrated circuit, such as a processor 104, timer 124, timer module 200, timer 202, timer failure detector 204, timer comparator 206, timer operation status module 208, timer functional status module 210, time based adjuster 212, timer 302a, 302b, 302c, timer 402a, 402b, 402c), in software executing in a processor (e.g., timer 124, timer module 200, timer 202, timer failure detector 204, timer comparator 206, timer operation status module 208, timer functional status module 210, time based adjuster 212, timer 302a, 302b, 302c, timer 402a, 402b, 402c), or in a combination of a software-configured processor and dedicated hardware (e.g., independent redundant timer system 300, independent redundant timer system 400) that includes other individual components, and various memory/cache controllers. In order to encompass the alternative configurations enabled in various embodiments, the hardware implementing the method 500 is referred to herein as an "timer control device."

In block 502, the timer control device may run multiple timers in parallel. The timers run in parallel may include at least one operation timer and at least one monitor timer. In some embodiments, the at least one monitor timer may be at least two monitor timers. Each of the timers may be free from interference from the other timers at a hardware level, a software level, and a physical layout and logical level. The operation timer may execute periodic functions on different time slices. In some embodiments, the monitor timers may detect failure of the operation timer. In some embodiments, the operation timer and a monitor timer may detect failure of another monitor timer. Each timer may run on a different independent time base (ITB). In some embodiments, the timer control device running the multiple timers in parallel in block 502 may be a processor, a timer, and/or a timer module.

In block 504, the timer control device may monitor the timers for failure. In some embodiments, the timer control device, running the timers may use the timers to monitor the other timers for failure. In some embodiments, the timer control device monitoring the timers for failure in block 504 may be a processor, a timer, a timer module, and/or timer comparator. In some embodiments, the monitor timers may monitor the operation timer for failure. A monitor timer may receive a timestamp (e.g., timestamp 304a in FIG. 3A, 404a in FIGS. 4A-4D) from the operation timer and compare the independent time base of the operation timer using the received timestamp to the independent time base of the monitor timer. The monitor timer may determine that the operation timer has failed in response to determining that there is a difference between the independent time bases of the operation timer and the monitor timer. In some embodiments, the difference may be any difference. In some embodiments, the difference may be a difference exceeding a threshold.

In some embodiments, the operation timer and a monitor timer may monitor the other monitor timer for failure. The operation timer and the monitor timer may receive a timestamp (e.g., timestamp 304b in FIG. 3A, 404b in FIGS. 4A and 4C) from the other monitor timer. The operation timer may compare the independent time base of the other monitor timer using the received timestamp to the independent time base of the operation timer. The monitor timer may compare the independent time base of the other monitor timer using the received timestamp to the independent time base of the monitor timer.

In block 506, the timer control device may detect a failed timer. The operation timer may determine that the other monitor timer has failed in response to determining that there is a difference between the independent time bases of the operation timer and the other monitor timer. The monitor timer may determine that the other monitor timer has failed in response to determining that there is a difference between the independent time bases of the other monitor timer and the monitor timer. In some embodiments, the difference may be any difference. In some embodiments, the difference may be a difference exceeding a threshold. In some embodiments, the timer control device detecting the failed timer in block 506 may be a processor, a timer, a timer module, timer comparator, and/or a timer failure detector.

In block 508, the timer control device may remove the failed timer from use. In response to detecting the failed timer, the timer control device may remove the failed timer from use, preventing the failed timer from communicating with other components of the computing device, including other timers. In some embodiments, the control device may change an operation status of the timer. The operation status may indicate to the timer and/or to other components of the computing device the operation status of the timer and may indicate to the timer its functions, such as which components the timer may communicate with and/or monitor. In some embodiments, the operation status of the time may indicate that the timer as failed and/or is unavailable. For example, a timer may have an operation status of an operating timer when the timer is detected to have failed. The timer may have been implementing the functions and communications of an operating timer. As another example, a timer may have an operation status of a monitoring timer when the timer is detected to have failed. The timer may have been implementing the functions and communications of a monitoring timer. In either example, in response to detecting the failed timer, the timer control device may set the operation status of the timer to an operation status of a failed timer, which may limit the functions and communications of the failed timer to those necessary to further evaluate the failed timer. In some embodiments, the timer control device removing the failed timer from use in block 508 may be a processor, a timer, a timer module, a timer failure detector, and/or timer operation status module.

In block 510, the timer control device may manage the function and/or operation of the timer(s). The timer control device may manage the function and/or operation of the timer(s), such as failed timers, operation timers, and/or monitor timers, as described further herein for the method 600 with reference to FIG. 6 and/or the method 700 with reference to FIG. 7. In some embodiments, the methods 600, 700 may be implemented independently. In some embodiments, the methods 600, 700 may be implemented jointly. In some embodiments, the methods 600, 700 may be implemented in parallel. In some embodiments, the timer control device managing the function and/or operation of the timer(s) in block 510 may be a processor, a timer, a timer module, a timer failure detector, a timer comparator, timer operation status module, a timer functional status module, and/or a timer time base adjuster.

The method 500 may can be recursively invoked. In some embodiments, profiling may be implemented and reported to an overall safety management handler to determine which timer has failed, how many times the timer had failed, a number of recoveries for the timer, and what is a current difference in independent time base for each failed timer.

Figure 6:
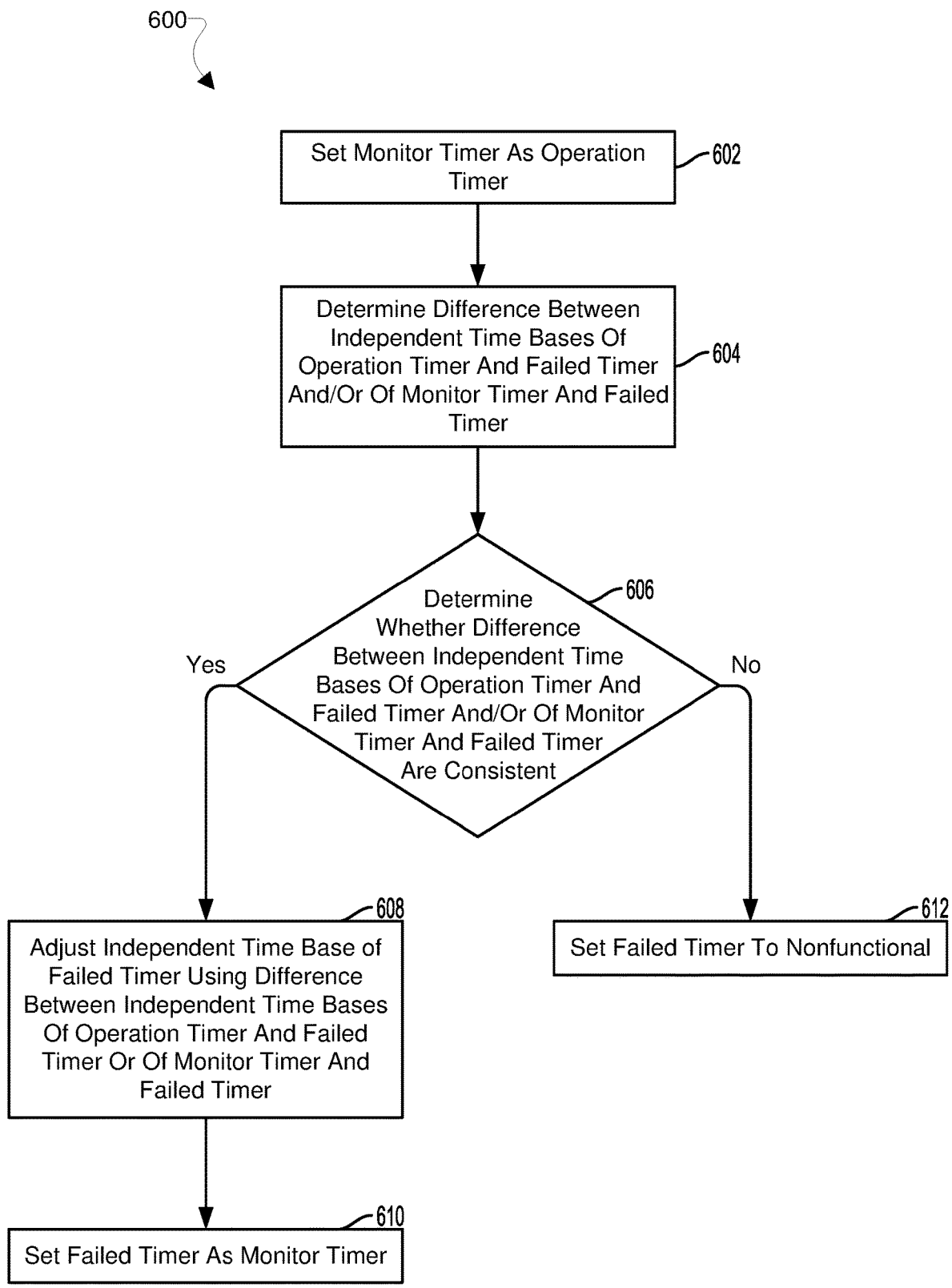
FIG. 6 is a process flow diagram illustrating a method SoC timer failure detection and recovery using independent redundant timers according to an embodiment.

FIG. 6 illustrates a method 600 for SoC timer failure detection and recovery using independent redundant timers according to an embodiment. With reference to FIGS. 1-6, the method 600 may be implemented in an integrated circuit (e.g., SoC 102) or a component within an integrated circuit, such as a processor 104, timer 124, timer module 200, timer 202, timer failure detector 204, timer comparator 206, timer operation status module 208, timer functional status module 210, time based adjuster 212, timer 302a, 302b, 302c, timer 402a, 402b, 402c), in software executing in a processor (e.g., timer 124, timer module 200, timer 202, timer failure detector 204, timer comparator 206, timer operation status module 208, timer functional status module 210, time based adjuster 212, timer 302a, 302b, 302c, timer 402a, 402b, 402c), or in a combination of a software-configured processor and dedicated hardware (e.g., independent redundant timer system 300, independent redundant timer system 400) that includes other individual components, and various memory/cache controllers. In order to encompass the alternative configurations enabled in various embodiments, the hardware implementing the method 600 is referred to herein as an "timer control device."

In the method 500 described with reference to FIG. 5, the timer control device may have detected an operation timer as the failed timer in block 506 and removed the failed (operation) timer from use in block 508.

In block 602, the timer control device may set a monitor timer as an operation timer. The timer control device may change the operation status of the monitor timer from an operation status of monitor timer to operation timer. The operation status for the timer may indicate to the timer to implement the functions and communications of an operation timer. The monitor timer converted to the operation timer may replace the failed (operation) timer. In some embodiments, the conversion of the monitor timer to the operation timer may be implemented within a fault tolerant time interval of a time critical system. In some embodiments, the timer control device setting the monitor timer as the operation timer in block 602 may be a processor, a timer, a timer module, a timer failure detector, and/or a timer operation status module.

In block 604, the timer control device may determine a difference between independent time bases of the operation timer and the failed timer and/or between independent time bases of a monitor timer and the failed timer. The failed timer may be evaluated to determine whether it may be used as a monitor timer or remain removed from use by comparing the independent time base of the failed timer to the independent time base of the operation timer and/or to the independent time base of the monitor timer. These comparisons may determine whether there is a difference between the independent time base of the failed timer and the independent time base of the operation timer and/or a difference between the independent time base of the failed timer and the independent time base of the second monitor timer. In some embodiments, the timer control device determining the difference between independent time bases of the operation timer and the failed timer and/or between independent time bases of a monitor timer and the failed timer in block 604 may be a processor, a timer, a timer module, and/or a timer comparator.

In determination block 606, the timer control device may determine whether the difference between the independent time bases of the operation timer and the failed timer and/or between the independent time bases of the monitor timer and the failed timer are consistent. Whether the independent time base differences with the operation timer and/or with the monitor timer are consistent may be determined over time. For example, whether the independent time base differences with the operation timer and/or with the monitor timer are consistent may be repeatedly determined until there is sufficient confidence that the independent time base differences are consistent, e.g., over a defined number of iterations, deterministic time interval, etc. In some embodiments, the timer control device determining whether the difference between the independent time bases of the operation timer and the failed timer and/or between the independent time bases of the monitor timer and the failed timer are consistent in determination block 606 may be a processor, a timer, a timer module, a timer failure detector, and/or a timer comparator.

In response to determining that the difference between the independent time bases of the operation timer and the failed timer and/or between the independent time bases of the monitor timer and the failed timer are consistent (i.e., determination block 606="Yes"), the timer control device may adjust the independent time base of the failed timer using the difference between the independent time bases of the operation timer and the failed timer and/or the independent time bases of the monitor timer and the failed timer in block 608. To account for the earlier failure of the failed timer, the independent time base of the failed timer may be adjusted with a time adjustment. The adjusted independent time base for the failed timer may be the independent time base of the failed timer adjusted by the difference between the independent time bases of the failed timer and of the operation timer; or adjusted by the difference between the independent time bases of the failed timer and of the monitor timer. In some embodiments, the timer control device adjusting the independent time base of the failed timer using the difference between the independent time bases of the operation timer and the failed timer and/or the independent time bases of the monitor timer and the failed timer in block 608 may be a processor, a timer, a timer module, a timer failure detector, and/or a timer time base adjuster.

In block 610, the timer control device may set the failed timer as a monitor timer. The timer control device may change the operation status of the failed timer from an operation status of failed timer to monitor timer. The operation status for the timer may indicate to the timer to implement the functions and communications of a monitor timer. The failed timer converted to the monitor timer may replace the monitor timer converted to the operation timer in block 602. In some embodiments, the timer control device setting the failed timer as a monitor timer in block 610 may be a processor, a timer, a timer module, a timer failure detector, and/or a timer operation status module.

In response to determining that the difference between the independent time bases of the operation timer and the failed timer and/or between the independent time bases of the monitor timer and the failed timer are not consistent (i.e., determination block 606="No"), the timer control device may set the failed timer to a nonfunctional timer in block 612. The timer control device may change a functional status of the failed timer to a nonfunctional timer. A timer assigned a nonfunctional timer status may not implement any timer functions and/or communications, and/or be ignored by components of the computing device. The nonfunctional timer may remain a nonfunctional timer until an independent redundant timer system is completely recovered. In some embodiments, the timer control device setting the failed timer to the nonfunctional timer in block 612 may be a processor, a timer, a timer module, a timer failure detector, and/or a timer functional status module.

Figure 7:
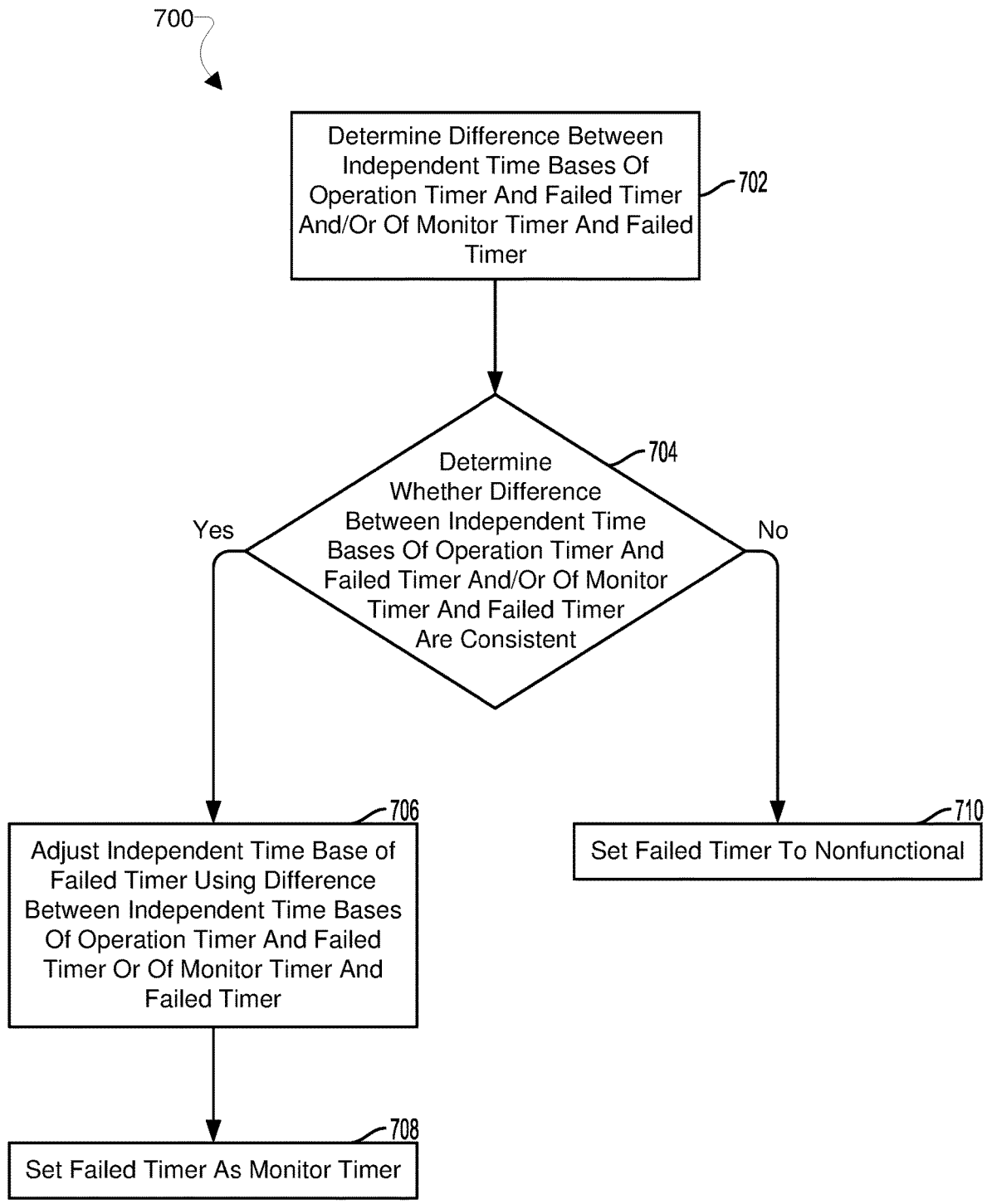
FIG. 7 is a process flow diagram illustrating a method SoC timer failure detection and recovery using independent redundant timers according to an embodiment.

FIG. 7 illustrates a method 700 for SoC timer failure detection and recovery using independent redundant timers according to an embodiment. With reference to FIGS. 1-7, the method 700 may be implemented in an integrated circuit (e.g., SoC 102) or a component within an integrated circuit, such as a processor 104, timer 124, timer module 200, timer 202, timer failure detector 204, timer comparator 206, timer operation status module 208, timer functional status module 210, time based adjuster 212, timer 302a, 302b, 302c, timer 402a, 402b, 402c), in software executing in a processor (e.g., timer 124, timer module 200, timer 202, timer failure detector 204, timer comparator 206, timer operation status module 208, timer functional status module 210, time based adjuster 212, timer 302a, 302b, 302c, timer 402a, 402b, 402c), or in a combination of a software-configured processor and dedicated hardware (e.g., independent redundant timer system 300, independent redundant timer system 400) that includes other individual components, and various memory/cache controllers. In order to encompass the alternative configurations enabled in various embodiments, the hardware implementing the method 700 is referred to herein as an "timer control device."

In the method 500 described with reference to FIG. 5, the timer control device may have detected a monitor timer as the failed timer in block 506 and removed the failed (monitor) timer from use in block 508.

In block 702, the timer control device may determine a difference between independent time bases of the operation timer and the failed timer and/or between independent time bases of a monitor timer and the failed timer. The failed timer may be evaluated to determine whether it may be used as a monitor timer or remain removed from use by comparing the independent time base of the failed timer to the independent time base of the operation timer and/or to the independent time base of the monitor timer. These comparisons may determine whether there is a difference between the independent time base of the failed timer and the independent time base of the operation timer and/or a difference between the independent time base of the failed timer and the independent time base of the second monitor timer. In some embodiments, the timer control device determining the difference between independent time bases of the operation timer and the failed timer and/or between independent time bases of a monitor timer and the failed timer in block 702 may be a processor, a timer, a timer module, and/or a timer comparator.

In determination block 704, the timer control device may determine whether the difference between the independent time bases of the operation timer and the failed timer and/or between the independent time bases of the monitor timer and the failed timer are consistent. Whether the independent time base differences with the operation timer and/or with the monitor timer are consistent may be determined over time. For example, whether the independent time base differences with the operation timer and/or with the monitor timer are consistent may be repeatedly determined until there is sufficient confidence that the independent time base differences are consistent, e.g., over a defined number of iterations, deterministic time interval, etc. In some embodiments, the timer control device determining whether the difference between the independent time bases of the operation timer and the failed timer and/or between the independent time bases of the monitor timer and the failed timer are consistent in determination block 704 may be a processor, a timer, a timer module, a timer failure detector, and/or a timer comparator.

In response to determining that the difference between the independent time bases of the operation timer and the failed timer and/or between the independent time bases of the monitor timer and the failed timer are consistent (i.e., determination block 704="Yes"), the timer control device may adjust the independent time base of the failed timer with a time adjustment using the difference between the independent time bases of the operation timer and the failed timer and/or the independent time bases of the monitor timer and the failed timer in block 706. Thus, to account for the earlier failure of the failed timer, the independent time base of the failed timer may be adjusted. The adjusted independent time base for the failed timer may be the independent time base of the failed timer adjusted by the difference between the independent time bases of the failed timer and of the operation timer; or adjusted by the difference between the independent time bases of the failed timer and of the monitor timer. In some embodiments, the timer control device adjusting the independent time base of the failed timer using the difference between the independent time bases of the operation timer and the failed timer and/or the independent time bases of the monitor timer and the failed timer in block 706 may be a processor, a timer, a timer module, a timer failure detector, and/or a timer time base adjuster.

In block 708, the timer control device may set the failed timer as a monitor timer. The timer control device may change the operation status of the failed timer from an operation status of failed timer to monitor timer. The operation status for the timer may indicate to the timer to implement the functions and communications of a monitor timer. The failed timer converted to the monitor timer may reinstate the monitor timer converted to the failed timer in block 508 of the method 500 described herein with reference to FIG. 5. In some embodiments, the timer control device setting the failed timer as a monitor timer in block 708 may be a processor, a timer, a timer module, a timer failure detector, and/or a timer operation status module.

In response to determining that the difference between the independent time bases of the operation timer and the failed timer and/or between the independent time bases of the monitor timer and the failed timer are not consistent (i.e., determination block 704="No"), the timer control device may set the failed timer to a nonfunctional timer in block 710. The timer control device may change a functional status of the failed timer to a nonfunctional timer. A timer assigned a nonfunctional timer status may not implement any timer functions and/or communications, and/or be ignored by components of the computing device. The nonfunctional timer may remain a nonfunctional timer until an independent redundant timer system is completely recovered. In some embodiments, the timer control device setting the failed timer to the nonfunctional timer in block 710 may be a processor, a timer, a timer module, a timer failure detector, and/or a timer functional status module.

Figure 8:
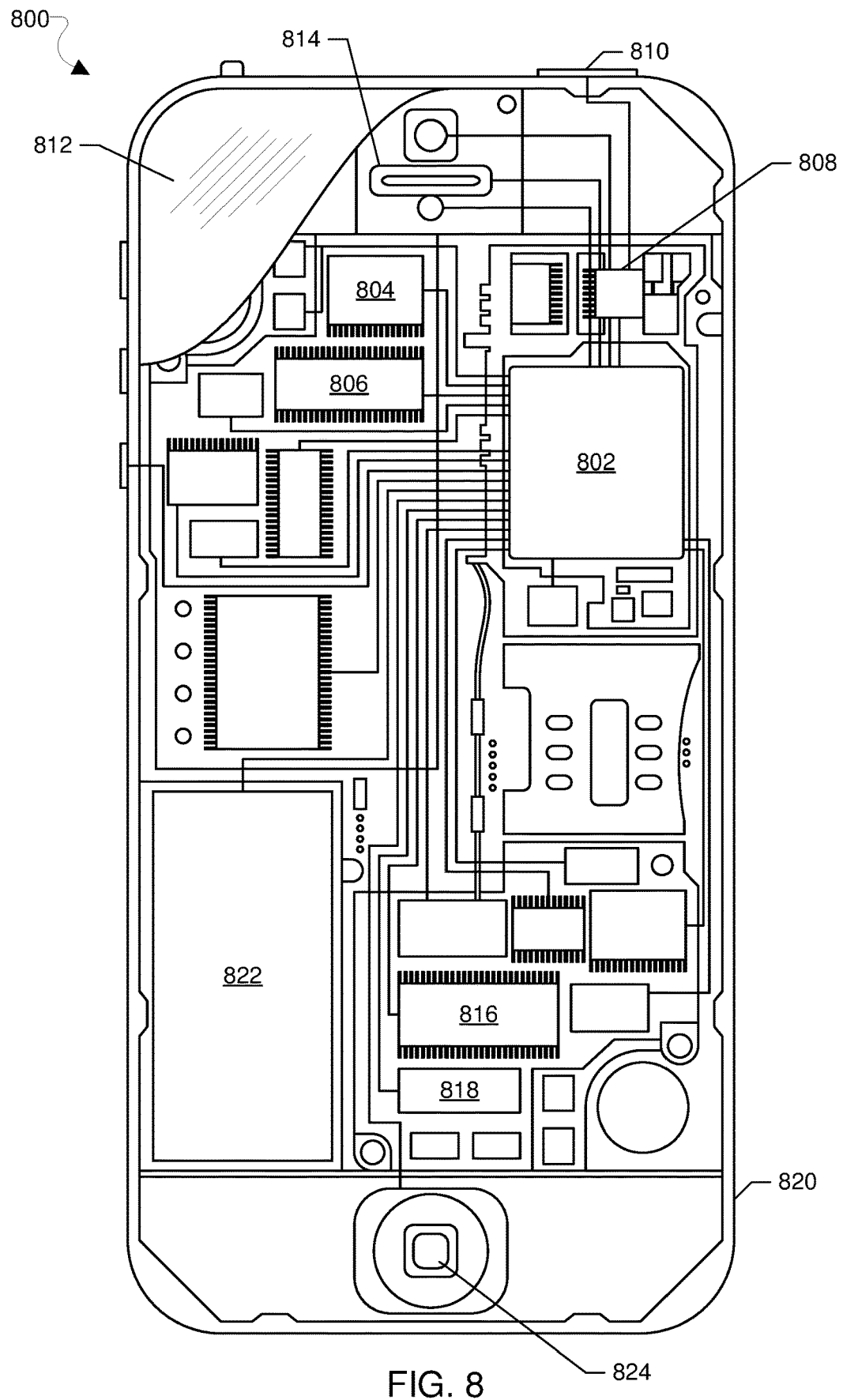
FIG. 8 is a component block diagram illustrating an example mobile computing device suitable for implementing various embodiments.

A system in accordance with various embodiments (including, but not limited to, embodiments described above with reference to FIGS. 1-7) may be implemented in a wide variety of computing systems including mobile computing devices, an example of which suitable for use with various embodiments is illustrated in FIG. 8. The mobile computing device 800 may include a processor 802 coupled to a touchscreen controller 804 and an internal memory 806. The processor 802 may be one or more multicore integrated circuits designated for general or specific processing tasks. The internal memory 806 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile computing device 800 need not have touch screen capability.

The mobile computing device 800 may have one or more radio signal transceivers 808 (e.g., Peanut, Bluetooth, Zig-Bee, Wi-Fi, RF radio) and antennae 810, for sending and receiving communications, coupled to each other and/or to the processor 802. The transceivers 808 and antennae 810 may be used with the above-mentioned circuitry to implement the various wireless transmission protocol stacks and interfaces. The mobile computing device 800 may include a cellular network wireless modem chip 816 that enables communication via a cellular network and is coupled to the processor.

The mobile computing device 800 may include a peripheral device connection interface 818 coupled to the processor 802. The peripheral device connection interface 818 may be singularly configured to accept one type of connection, or may be configured to accept various types of physical and communication connections, common or proprietary, such as Universal Serial Bus (USB), FireWire. Thunderbolt, or PCIe. The peripheral device connection interface 818 may also be coupled to a similarly configured peripheral device connection port (not shown).

The mobile computing device 800 may also include speakers 814 for providing audio outputs. The mobile computing device 800 may also include a housing 820, constructed of a plastic, metal, or a combination of materials, for containing all or some of the components described herein. The mobile computing device 800 may include a power source 822 coupled to the processor 802, such as a disposable or rechargeable battery. The rechargeable battery may also be coupled to the peripheral device connection port to receive a charging current from a source external to the mobile computing device 800. The mobile computing device 800 may also include a physical button 824 for receiving user inputs. The mobile computing device 800 may also include a power button 824 for turning the mobile computing device 800 on and off.

Figure 9:
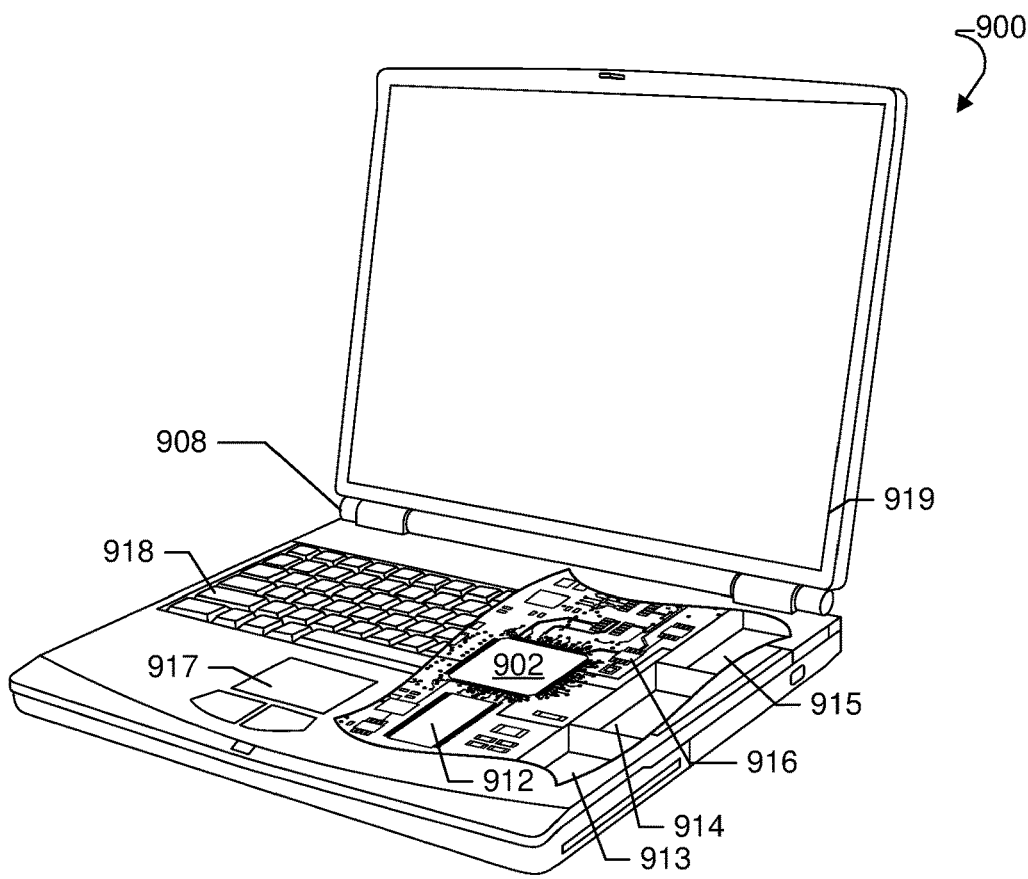
FIG. 9 is a component block diagram illustrating an example mobile computing device suitable for implementing various embodiments.

A system in accordance with various embodiments (including, but not limited to, embodiments described above with reference to FIGS. 1-7) may be implemented in a wide variety of computing systems include a laptop computer 900 an example of which is illustrated in FIG. 9. Many laptop computers include a touchpad touch surface 917 that serves as the computer's pointing device, and thus may receive drag, scroll, and flick gestures similar to those implemented on computing devices equipped with a touch screen display and described above. A laptop computer 900 will typically include a processor 902 coupled to volatile memory 912 and a large capacity nonvolatile memory, such as a disk drive 913 of Flash memory. Additionally, the computer 900 may have one or more antenna 908 for sending and receiving electromagnetic radiation that may be connected to a wireless data link and/or cellular telephone transceiver 916 coupled to the processor 902. The computer 900 may also include a floppy disc drive 914 and a compact disc (CD) drive 915 coupled to the processor 902. In a notebook configuration, the computer housing includes the touchpad 917, the keyboard 918, and the display 919 all coupled to the processor 902. Other configurations of the computing device may include a computer mouse or trackball coupled to the processor (e.g., via a USB input) as are well known, which may also be used in conjunction with various embodiments.

Figure 10:
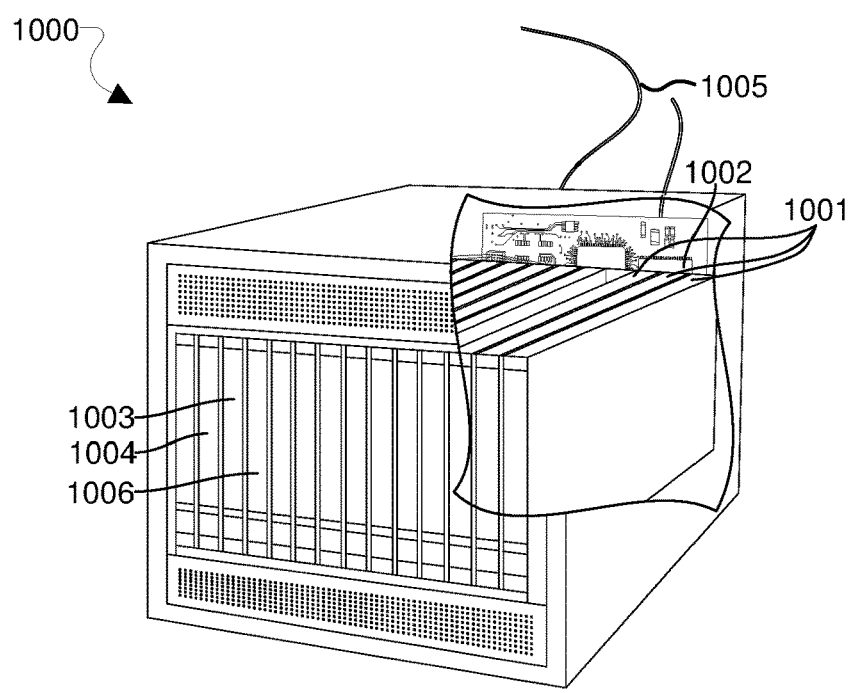
FIG. 10 is a component block diagram illustrating an example server suitable for implementing various embodiments.

A system in accordance with various embodiments (including, but not limited to, embodiments described above with reference to FIGS. 1-7) may also be implemented in fixed computing systems, such as any of a variety of commercially available servers. An example server 1000 is illustrated in FIG. 10. Such a server 1000 typically includes one or more multicore processor assemblies 1001 coupled to volatile memory 1002 and a large capacity nonvolatile memory, such as a disk drive 1004. As illustrated in FIG. 10, multicore processor assemblies 1001 may be added to the server 1000 by inserting them into the racks of the assembly. The server 1000 may also include a floppy disc drive, compact disc (CD) or digital versatile disc (DVD) disc drive 1006 coupled to the processor 1001. The server 1000 may also include network access ports 1003 coupled to the multicore processor assemblies 1001 for establishing network interface connections with a network 1005, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Implementation examples are described in the following paragraphs. While some of the following implementation examples are described in terms of example methods, further example implementations may include: the example methods discussed in the following paragraphs implemented by an integrated circuit including a processor configured with processor-executable instructions to perform operations of the example methods; the example methods discussed in the following paragraphs implemented by an integrated circuit including means for performing functions of the example methods; and the example methods discussed in the following paragraphs implemented as a non-transitory processor-readable storage medium having stored thereon processor-executable instructions configured to cause an integrated circuit including to perform the operations of the example methods.

Example 1. A method of timer failure detection and recovery, including running a plurality of timers in parallel, having at least a first timer, a second timer, and a third timer, each having an independent time base, determining whether the first timer of the plurality of timers fails, removing the first timer from use in response to determining that the first timer fails, determining whether the first timer has a consistent difference in independent time base with the second timer of the plurality of timers, and returning the first timer to use with a time adjustment in response to determining that the first timer has a consistent difference in independent time base with the second timer.

Example 2. The method of example 1, in which the first timer is a first operation timer and the third timer is a monitor timer, the method including converting the monitor timer to a second operation timer.

Example 3. The method of example 2, in which converting the monitor timer to the second operation timer occurs within a fault tolerant interval for a time critical system.

Example 4. The method of any of examples 1-3, in which the first timer is an operation timer, and in which returning the first timer to use in response to determining that the first timer has a consistent difference in independent time base with the second timer includes returning the operation timer to use as a monitor timer.

Example 5. The method of any of examples 1-4, in which the first timer is a monitor timer, and in which returning the first timer to use in response to determining that the first timer has a consistent difference in independent time base with the second timer includes returning the monitor timer to use as the monitor timer.

Example 6. The method of any of examples 1-5, including adjusting the independent time base of the first timer as the time adjustment using the consistent difference in independent time base with the second timer in response to determining that the first timer has a consistent difference in independent time base with the second timer.

Example 7. The method of any of examples 1-6, including determining whether the first timer has a consistent difference in independent time base with the third timer of the plurality of timers, and returning the first timer to use with a time adjustment in response to determining that the first timer has a consistent difference in independent time base with the third timer.

Computer program code or "program code" for execution on a programmable processor for carrying out operations of various embodiments may be written in a high level programming language such as C. C++, C#, Smalltalk, Java, JavaScript. Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of timer failure detection and recovery, comprising:
    running a plurality of timers in parallel, having at least a first timer, a second timer, and a third timer, each having an independent time base;
    determining whether the first timer of the plurality of timers fails;
    removing the first timer from use in response to determining that the first timer fails;
    determining whether the first timer has a consistent difference in independent time base with the second timer of the plurality of timers; and
    returning the first timer to use with a time adjustment in response to determining that the first timer has a consistent difference in independent time base with the second timer.

2. The method of claim 1, wherein the first timer is a first operation timer and the third timer is a monitor timer, the method further comprising converting the monitor timer to a second operation timer.

3. The method of claim 2, wherein converting the monitor timer to the second operation timer occurs within a fault tolerant interval for a time critical system.

4. The method of claim 1, wherein the first timer is an operation timer, and wherein returning the first timer to use in response to determining that the first timer has a consistent difference in independent time base with the second timer comprises returning the operation timer to use as a monitor timer.

5. The method of claim 1, wherein the first timer is a monitor timer, and wherein returning the first timer to use in response to determining that the first timer has a consistent difference in independent time base with the second timer comprises returning the monitor timer to use as the monitor timer.

6. The method of claim 1, further comprising adjusting the independent time base of the first timer as the time adjustment using the consistent difference in independent time base with the second timer in response to determining that the first timer has a consistent difference in independent time base with the second timer.

7. The method of claim 1, further comprising:
    determining whether the first timer has a consistent difference in independent time base with the third timer of the plurality of timers; and
    returning the first timer to use with a time adjustment in response to determining that the first timer has a consistent difference in independent time base with the third timer.

8. A computing device, comprising
    a plurality of timers configured run in parallel, having at least a first timer, a second timer, and a third timer, each having an independent time base; and
    a timer control device communicatively connected to the plurality of timers and configured to:
        determine whether the first timer of the plurality of timers fails;
        remove the first timer from use in response to determining that the first timer fails;
        determine whether the first timer has a consistent difference in independent time base with the second timer of the plurality of timers; and
        return the first timer to use with a time adjustment in response to determining that the first timer has a consistent difference in independent time base with the second timer.

9. The computing device of claim 8, wherein the first timer is a first operation timer and the third timer is a monitor timer, and wherein the timer control device is further configured to convert the monitor timer to a second operation timer.

10. The computing device of claim 9, wherein the timer control device is configured to convert the monitor timer to the second operation timer within a fault tolerant interval for a time critical system.

11. The computing device of claim 8, wherein the first timer is an operation timer, and wherein the timer control device is further configured to return the first timer to use in response to determining that the first timer has a consistent difference in independent time base with the second timer by returning the operation timer to use as a monitor timer.

12. The computing device of claim 8, wherein the first timer is a monitor timer, and wherein the timer control device is further configured to return the first timer to use in response to determining that the first timer has a consistent difference in independent time base with the second timer by returning the monitor timer to use as the monitor timer.

13. The computing device of claim 8, wherein the timer control device is further configured to adjust the independent time base of the first timer as the time adjustment using the consistent difference in independent time base with the second timer in response to determining that the first timer has a consistent difference in independent time base with the second timer.

14. The computing device of claim 8, wherein the timer control device is further configured to:
   determine whether the first timer has a consistent difference in independent time base with the third timer of the plurality of timers; and
   return the first timer to use with a time adjustment in response to determining that the first timer has a consistent difference in independent time base with the third timer.

15. A computing device, comprising:
   means for running a plurality of timers in parallel, having at least a first timer, a second timer, and a third timer, each having an independent time base;
   means for determining whether the first timer of the plurality of timers fails;
   means for removing the first timer from use in response to determining that the first timer fails;
   means for determining whether the first timer has a consistent difference in independent time base with the second timer of the plurality of timers; and
   means for returning the first timer to use with a time adjustment in response to determining that the first timer has a consistent difference in independent time base with the second timer.

16. The computing device of claim 15, wherein the first timer is a first operation timer and the third timer is a monitor timer, the computing device further comprising means for converting the monitor timer to a second operation timer.

17. The computing device of claim 16, wherein means for converting the monitor timer to the second operation timer comprises means for converting the monitor timer to the second operation timer within a fault tolerant interval for a time critical system.

18. The computing device of claim 15, wherein the first timer is an operation timer, and wherein means for returning the first timer to use in response to determining that the first timer has a consistent difference in independent time base with the second timer comprises means for returning the operation timer to use as a monitor timer.

19. The computing device of claim 15, wherein the first timer is a monitor timer, and wherein means for returning the first timer to use in response to determining that the first timer has a consistent difference in independent time base with the second timer comprises means for returning the monitor timer to use as the monitor timer.

20. The computing device of claim 15, further comprising means for adjusting the independent time base of the first timer as the time adjustment using the consistent difference in independent time base with the second timer in response to determining that the first timer has a consistent difference in independent time base with the second timer.

21. The computing device of claim 15, further comprising:
   means for determining whether the first timer has a consistent difference in independent time base with the third timer of the plurality of timers; and
   means for means for returning the first timer to use with a time adjustment in response to determining that the first timer has a consistent difference in independent time base with the third timer.

22. A non-transitory processor-readable medium having stored thereon processor-executable instructions configured to cause a processing device to perform operations comprising:
   running a plurality of timers in parallel, having at least a first timer, a second timer, and a third timer, each having an independent time base;
   determining whether the first timer of the plurality of timers fails;
   removing the first timer from use in response to determining that the first timer fails;
   determining whether the first timer has a consistent difference in independent time base with the second timer of the plurality of timers; and
   returning the first timer to use with a time adjustment in response to determining that the first timer has a consistent difference in independent time base with the second timer.

23. The non-transitory processor-readable medium of claim 22, wherein the first timer is a first operation timer and the third timer is a monitor timer, and wherein the stored processor-executable instructions are configured to cause the processing device to perform operations further comprising converting the monitor timer to a second operation timer.

24. The non-transitory processor-readable medium of claim 23, wherein the stored processor-executable instructions are configured to cause the processing device to perform operations such that converting the monitor timer to the second operation timer occurs within a fault tolerant interval for a time critical system.

25. The non-transitory processor-readable medium of claim 22, wherein the first timer is an operation timer, and wherein the stored processor-executable instructions are configured to cause the processing device to perform operations such that returning the first timer to use in response to determining that the first timer has a consistent difference in independent time base with the second timer comprises returning the operation timer to use as a monitor timer.

26. The non-transitory processor-readable medium of claim 22, wherein the first timer is a monitor timer, and wherein the stored processor-executable instructions are configured to cause the processing device to perform operations such that returning the first timer to use in response to determining that the first timer has a consistent difference in independent time base with the second timer comprises returning the monitor timer to use as the monitor timer.

27. The non-transitory processor-readable medium of claim 22, wherein the stored processor-executable instructions are configured to cause the processing device to perform operations further comprising adjusting the independent time base of the first timer as the time adjustment using the consistent difference in independent time base with the second timer in response to determining that the first timer has a consistent difference in independent time base with the second timer.

28. The non-transitory processor-readable medium of claim 22, wherein the stored processor-executable instructions are configured to cause the processing device to perform operations further comprising:
   determining whether the first timer has a consistent difference in independent time base with the third timer of the plurality of timers; and
   returning the first timer to use with a time adjustment in response to determining that the first timer has a consistent difference in independent time base with the third timer.

* * * * *